United States Patent
Michler et al.

(10) Patent No.: US 9,604,381 B2
(45) Date of Patent: Mar. 28, 2017

(54) HIGH SPEED SMALL PACK WRAPPER

(71) Applicants: James R. Michler, Ashland, WI (US);
Timm G. Retzloff, Washburn, WI (US);
Andrew Kell Balduc, Ironwood, MI
(US); David J. Brauer, Saxon, WI
(US)

(72) Inventors: James R. Michler, Ashland, WI (US);
Timm G. Retzloff, Washburn, WI (US);
Andrew Kell Balduc, Ironwood, MI
(US); David J. Brauer, Saxon, WI
(US)

(73) Assignee: C.G. Bretting Manufacturing Co., Inc., Ashland, WI (US)

(*) Notice: Subject to any disclaimer, the term of this patent is extended or adjusted under 35 U.S.C. 154(b) by 163 days.

(21) Appl. No.: 14/635,128

(22) Filed: Mar. 2, 2015

(65) Prior Publication Data
US 2015/0174783 A1    Jun. 25, 2015

Related U.S. Application Data

(62) Division of application No. 13/849,215, filed on Mar. 22, 2013, now abandoned.
(Continued)

(51) Int. Cl.
*B26D 7/10* (2006.01)
*B65G 37/00* (2006.01)
(Continued)

(52) U.S. Cl.
CPC .............. *B26D 7/10* (2013.01); *B26D 1/305* (2013.01); *B26D 5/20* (2013.01); *B65G 29/00* (2013.01);
(Continued)

(58) Field of Classification Search
CPC . B26D 1/25; B26D 1/255; B26D 1/26; B26D 1/265; B26D 7/10; Y10T 83/293
(Continued)

(56) References Cited

U.S. PATENT DOCUMENTS

| | | | | |
|---|---|---|---|---|
| 1,617,058 A | * | 2/1927 | Krakora | B26D 1/25 83/109 |
| 1,735,818 A | * | 11/1929 | Ulbrecht | B26D 1/25 83/167 |

(Continued)

FOREIGN PATENT DOCUMENTS

| | | |
|---|---|---|
| EP | 0509666 A2 | 10/1992 |
| EP | 1 048 595 A1 | 11/2000 |

(Continued)

OTHER PUBLICATIONS

Intralox ARB Merges; internet site and video; date last visited Apr. 15, 2013; 2 pages printed from internet http://www.intralox.com/merges.aspx.

*Primary Examiner* — Sean Michalski
(74) *Attorney, Agent, or Firm* — Reinhart Boerner Van Deuren P.C.

(57) ABSTRACT

A system for forming and wrapping a plurality of stacks of sheet like product is provided. The system includes a separator apparatus for converting a stream of spaced apart sets of stacks into a repeating stepped configuration. The system includes a mechanism for merging the stepped configuration of stacks into a single file stream of stacks. The system includes a cutoff apparatus for cutting a plastic sleeve in which the stacks are wrapped. The system includes a turner apparatus for changing the direction of travel of individual units comprising of a stack of product within a length of the sleeve 90 degrees while maintaining the orientation of the units.

18 Claims, 11 Drawing Sheets

Related U.S. Application Data

(60) Provisional application No. 61/614,966, filed on Mar. 23, 2012.

(51) Int. Cl.

| | | |
|---|---|---|
| *B65G 29/00* | (2006.01) | |
| *B65G 47/244* | (2006.01) | |
| *B65G 47/68* | (2006.01) | |
| *B65H 31/30* | (2006.01) | |
| *B26D 1/30* | (2006.01) | |
| *B26D 5/20* | (2006.01) | |
| B65G 47/84 | (2006.01) | |
| B65B 11/28 | (2006.01) | |
| B65B 25/14 | (2006.01) | |
| B65G 47/32 | (2006.01) | |

(52) U.S. Cl.
CPC ........... *B65G 37/00* (2013.01); *B65G 47/244* (2013.01); *B65G 47/682* (2013.01); *B65G 47/841* (2013.01); *B65G 47/846* (2013.01); *B65H 31/3027* (2013.01); *B65H 31/3081* (2013.01); *B65B 11/28* (2013.01); *B65B 25/14* (2013.01); *B65G 47/32* (2013.01); *B65G 47/848* (2013.01); *B65H 2301/4452* (2013.01); *B65H 2301/4454* (2013.01); *B65H 2701/1822* (2013.01); *B65H 2701/18242* (2013.01); *B65H 2701/1924* (2013.01); *Y10T 83/293* (2015.04)

(58) Field of Classification Search
USPC ............. 83/23, 29, 202, 279, 280, 42, 404.2
See application file for complete search history.

(56) References Cited

U.S. PATENT DOCUMENTS

| | | | |
|---|---|---|---|
| 1,890,103 A * | 12/1932 | Watson .................... | B26D 1/25 83/404 |
| 2,479,676 A * | 8/1949 | Fox .......................... | B26D 1/25 83/562 |
| 2,617,190 A * | 11/1952 | Taylor ..................... | B26D 1/25 83/624 |
| 3,043,729 A * | 7/1962 | Seiden ..................... | B26D 1/00 156/367 |
| 3,329,252 A | 7/1967 | Anderson | |
| 3,333,514 A | 8/1967 | Jones | |
| 3,390,617 A * | 7/1968 | Cloud ...................... | B65B 9/13 226/6 |
| 3,417,540 A * | 12/1968 | Copping ................. | B65B 35/36 198/419.3 |
| 3,574,039 A * | 4/1971 | Fehr ..................... | B29C 65/7451 156/251 |
| 3,782,070 A * | 1/1974 | Erlandson ................ | B65B 9/06 53/557 |
| 3,971,273 A * | 7/1976 | Peters ..................... | B26D 1/25 83/157 |
| 3,981,660 A | 9/1976 | Forcella | |
| 4,120,221 A * | 10/1978 | Speich ...................... | B26F 3/06 83/171 |
| 4,138,073 A * | 2/1979 | Dowd ................ | B65H 19/1852 242/555.5 |
| 4,218,863 A | 8/1980 | Howard et al. | |
| 4,288,967 A * | 9/1981 | Seko ...................... | B29C 65/18 156/583.1 |
| 4,305,240 A | 12/1981 | Grevich et al. | |
| 4,313,781 A * | 2/1982 | Rovigo ..................... | B26F 3/06 156/269 |
| 4,430,844 A | 2/1984 | James | |
| 4,430,845 A | 2/1984 | Dohrendorf | |
| 4,516,458 A * | 5/1985 | Pomerantz ............... | B26D 1/26 30/116 |
| 4,546,595 A | 10/1985 | Yasumune et al. | |
| 4,572,044 A * | 2/1986 | Antonissen ............. | B26D 5/20 83/364 |
| 4,574,677 A * | 3/1986 | Huhne .................... | B26D 1/553 83/171 |
| 4,601,224 A * | 7/1986 | Clark, III .................. | B26F 3/12 700/160 |
| 4,608,893 A * | 9/1986 | Huhne ................... | B26D 1/553 83/171 |
| 4,679,379 A | 7/1987 | Cassoli | |
| 4,796,499 A * | 1/1989 | Achelpohl ............. | B31B 19/98 414/27 |
| 4,959,945 A | 10/1990 | Rooyakkers et al. | |
| 5,228,273 A | 7/1993 | Kovacs | |
| 5,901,530 A | 5/1999 | Draghetti et al. | |
| 5,979,278 A * | 11/1999 | Warthen ................... | B26D 1/09 26/7 |
| 6,109,154 A * | 8/2000 | Miyatsu ................. | B26D 1/085 83/202 |
| 6,152,007 A * | 11/2000 | Sato ..................... | B26D 1/0006 83/202 |
| 7,364,398 B2 | 4/2008 | Michler et al. | |
| 7,610,737 B2 | 11/2009 | Kovacs | |
| 7,861,630 B2 * | 1/2011 | Sorensen ............. | A22C 17/002 83/363 |
| 8,997,614 B2 * | 4/2015 | Baechtle .................. | B26D 1/56 83/112 |
| 2008/0115638 A1 * | 5/2008 | Nalle ...................... | B26D 7/10 83/16 |
| 2013/0152749 A1 * | 6/2013 | Salador ................... | A21C 15/04 83/13 |
| 2015/0246458 A1 * | 9/2015 | Gahler ..................... | B26D 5/32 83/42 |

FOREIGN PATENT DOCUMENTS

| | | |
|---|---|---|
| GB | 2262079 A | 6/1993 |
| GB | 2 297 955 A | 8/1996 |
| JP | 2002308217 A | 10/2002 |
| JP | 2004224421 A | 8/2004 |
| JP | 2007145415 A | 6/2007 |
| KR | 20110015830 A | 2/2011 |
| WO | WO 2004/103819 A1 | 12/2004 |

\* cited by examiner

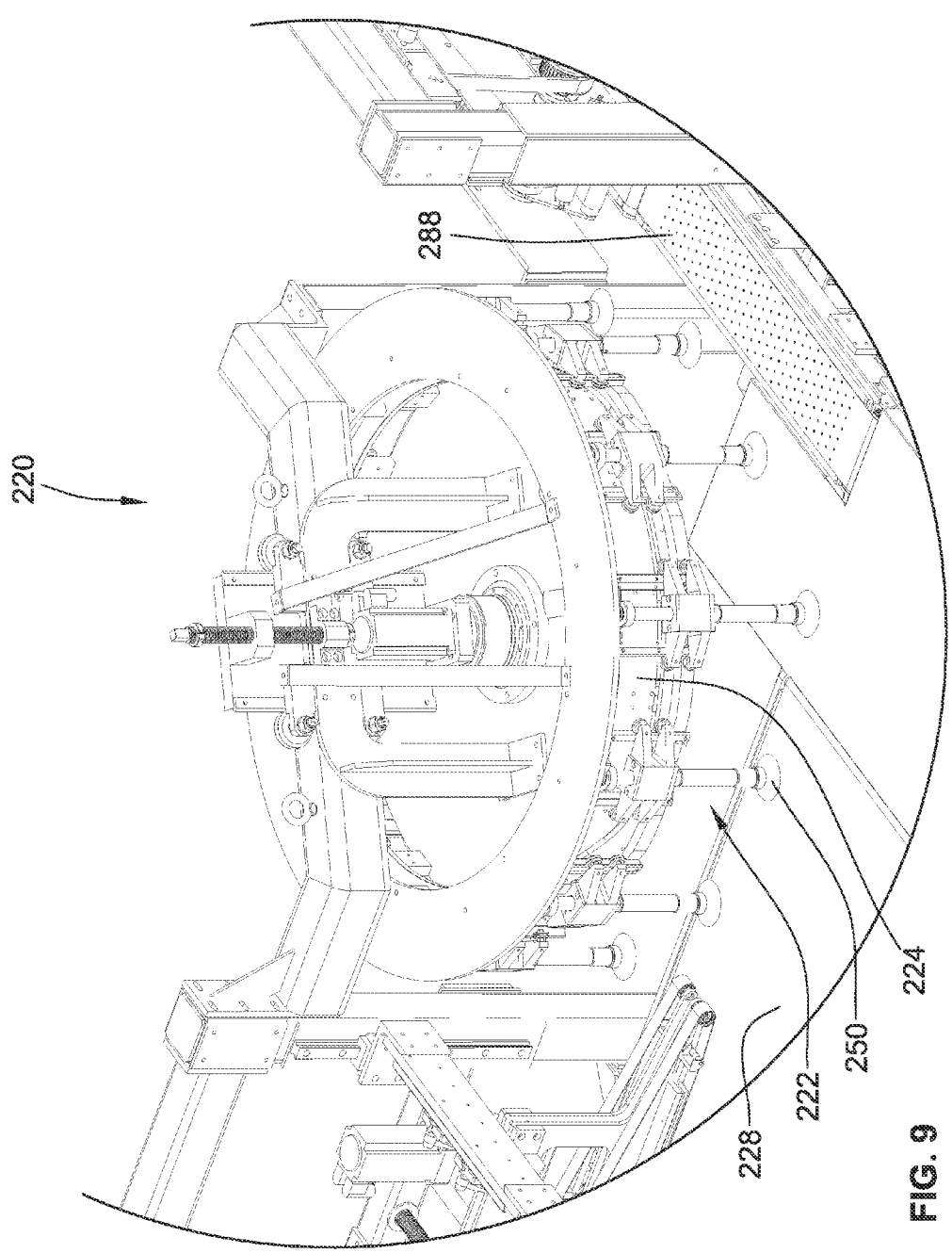

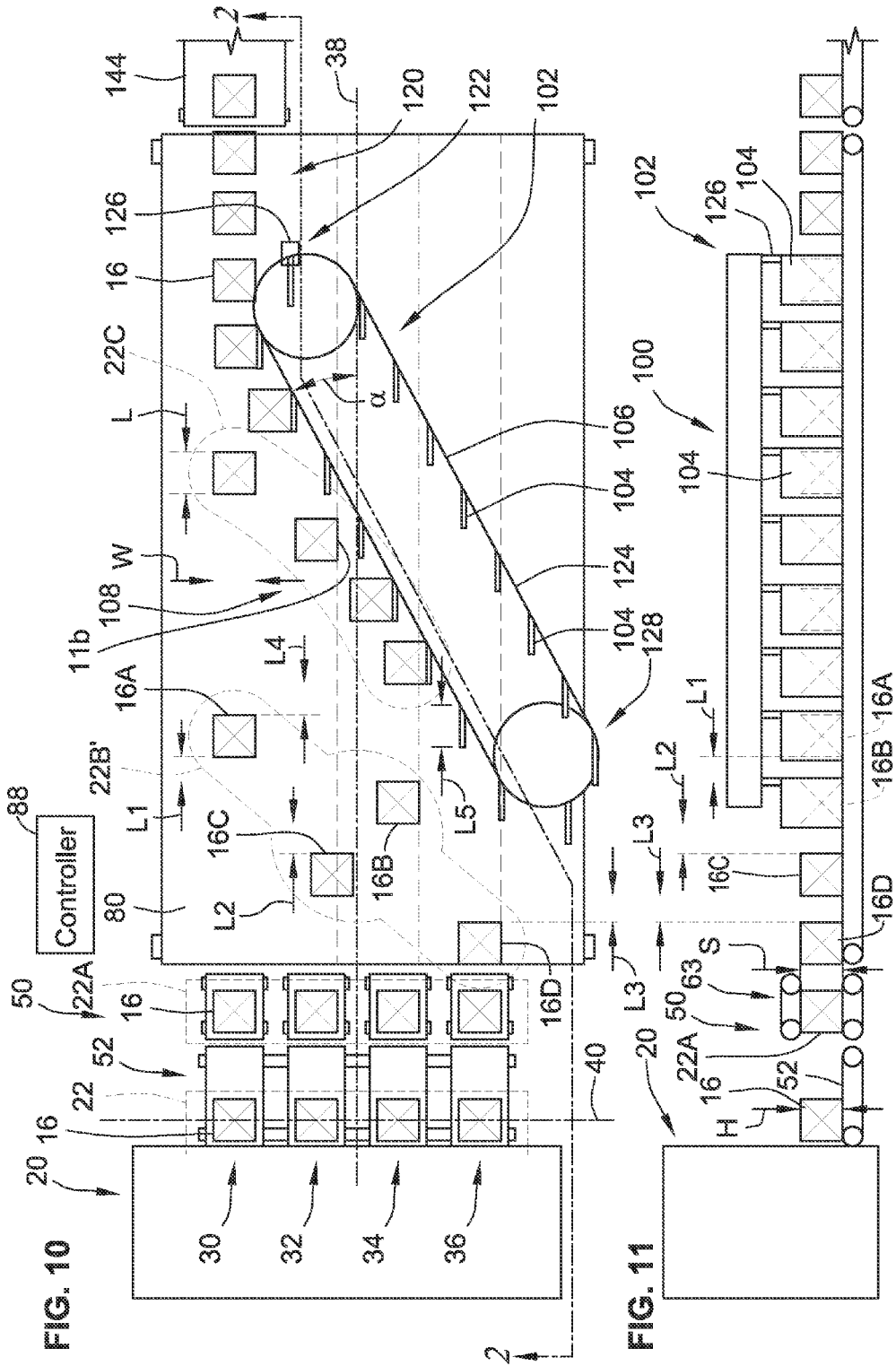

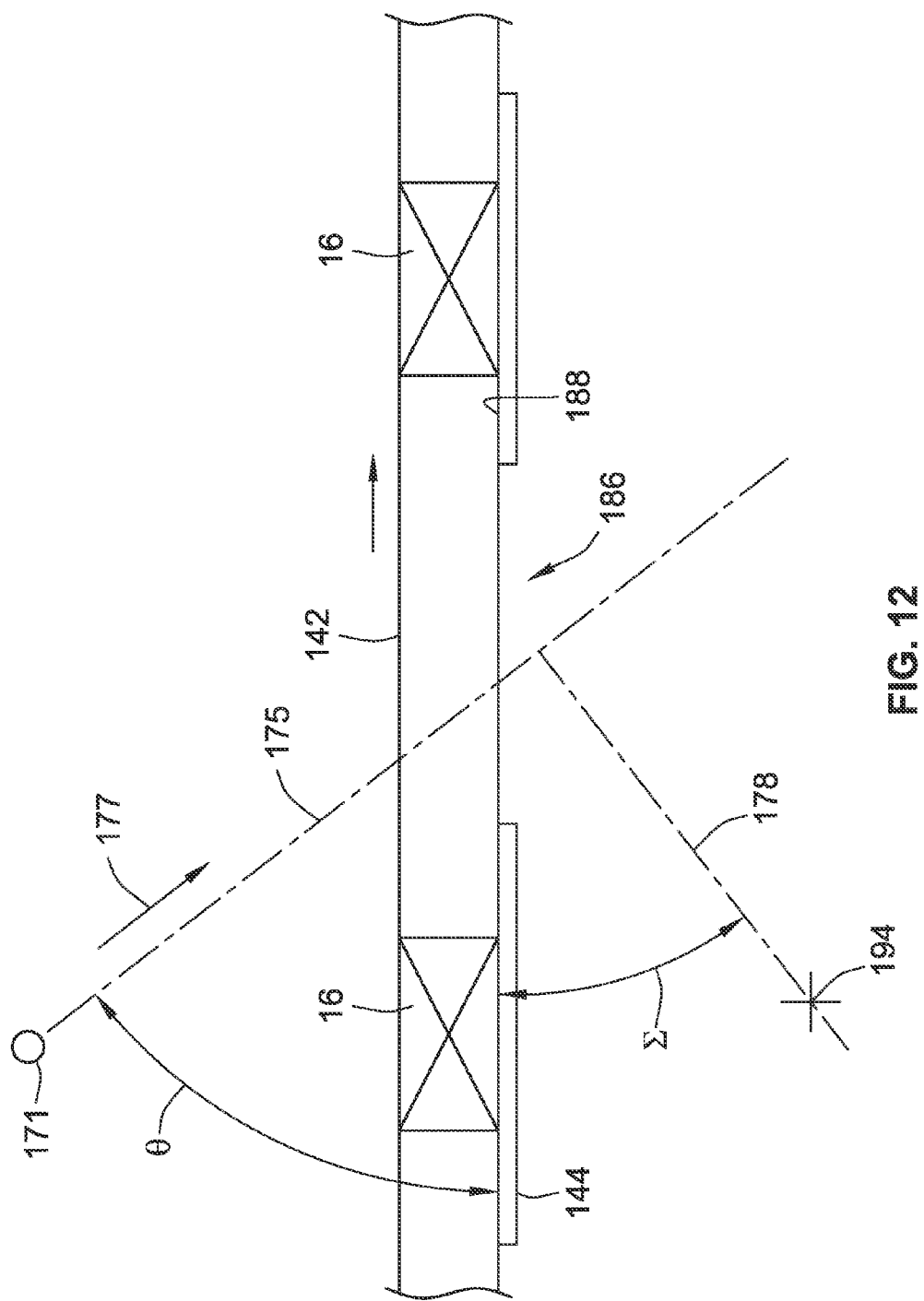

HIGH SPEED SMALL PACK WRAPPER

CROSS-REFERENCE TO RELATED PATENT APPLICATIONS

This patent application is a divisional of co-pending U.S. patent application Ser. No. 13/849,215, filed Mar. 22, 2013, which claims the benefit of U.S. Provisional Patent Application No. 61/614,966, filed Mar. 23, 2012, the entire teachings and disclosures of which are incorporated herein by reference thereto.

FIELD OF THE INVENTION

This invention generally relates to apparatuses and methods for wrapping a continuous stream of stacks of sheet like products such as facial tissues, napkins, paper towels, etc. within a thin plastic sleeve to form individual packs.

BACKGROUND OF THE INVENTION

Sheet like products such as facial tissues, napkins, paper towels, tissue paper, sheets of tin foil or wax paper, etc. are often packaged into individual packages having a stack of each product wrapped in a plastic wrapper. The machines that form the individual stacks of product often simultaneously form a set of stacks that are transversely offset from one another forming a plurality of lanes of stacks. These machines may interfold the sheets, fold the sheets with interfolding, form zig-zag sheets or even merely stack unfolded sheets.

Typically, the plurality of lanes is converted into a single file stream of stacks so that the single file stream of stacks can be passed through a wrapper. To form the single file stream of stacks, all of the stacks are typically deposited onto a discharge conveyor that deposits the stacks onto a wrapper in-feed conveyor that is a paddle style conveyor that extends at a right angle relative to the discharge conveyor. This arrangement is illustrated in FIGS. 25 and 27 of U.S. Pat. No. 7,364,398 assigned to the assignee of the instant application.

Unfortunately, this configuration has significant limits on speed. One particularly limitation is that the paddles must be far enough apart to allow the stacks to be fully positioned onto the wrapper in-feed conveyor while the paddles are moving. The paddle speed is equal to the paddle spacing multiplied by the number of packs per unit time. Further, it is highly preferred to have the paddle speed at less than 40 inches per second and a paddle spacing of at least 20 inches so to limit the amount of force that is applied to the stacks as they are engaged by the paddles. Unfortunately, this limits this type of transfer to 120 packs per minute or less.

A further problem with current pack wrappers is the ability to quickly and adequately cut the sleeve of plastic that surrounds the stack of product. Many prior art mechanisms for cutting the sleeve of plastic use complex cutting paths or complex machinery which are not suitable for making a high rate of cuts.

Finally, after the sleeve of plastic has been cut to form independent units of product that include a stack of product within a predetermined length of the plastic sleeve, the ends of the sleeve are open and need to be closed and then secured. Typically, this is done by again changing the direction of travel of the packs by 90 degrees using a sideways pusher and then passing the units through an apparatus that folds and then welds the open ends.

Unfortunately, the same problems discussed above apply to using a simple sideways push to change the direction of travel of the units by ninety degrees. Additionally, a reciprocal pusher mechanism further reduces the through put speeds due to the time required to get the pusher out of the way to receive the next unit in line.

There is therefore a need in the art for new and improved high speed wrappers and associated mechanisms and methods. The present invention relates to improvements over the current state of the art.

BRIEF SUMMARY OF THE INVENTION

A system of forming packs of product is provided. The system allows for increased pack formation. In some embodiments, the system can form in excess of 240 packs per minute and even more preferably in excess of 320 packs per minute. The system includes various patentable features that are patentable independently and in combination.

One implementation of the invention relates to a new and improved stack separator apparatus. The stack separator apparatus receives a stream of sets of stacks traveling along a flow path. Each set of stacks has a plurality of stacks that are at a same longitudinal position along the flow path and are offset from one another along a transverse axis that extends generally perpendicular to the flow path. Each stack in the set of stacks travels along the flow path within a corresponding one of a plurality of parallel lanes.

The stack separator apparatus includes a discharge conveyor arrangement; a plurality of separator conveyors downstream from the discharge conveyor arrangement; and a downstream receiving conveyor downstream from the separator conveyors. Each separator conveyor is aligned with a corresponding one of the parallel lanes. Each separator conveyor is configured to receive one stack of the set of stacks from the discharge conveyor arrangement. The plurality of separator conveyors are configured to sequentially discharge each stack of the group of stacks such that each stack of the set of stacks is discharged from its corresponding separator conveyor at a different longitudinal position along the flow path from the rest of the stacks of the set of stacks. The downstream receiving conveyor is configured to receive each stack of the set of stacks from the plurality of separator conveyors.

In a preferred embodiment, each separator conveyor is independently controllable such that the linear speeds of each can be adjusted without affecting the speed of the other separator conveyors.

In one embodiment, each separator conveyor includes a top belt vertically above a bottom belt. More preferably, the vertical distance between the top belt and the bottom belt is adjustable to accommodate stacks having different vertical heights.

In one embodiment, adjacent stacks define a longitudinal spacing after both of the adjacent stacks have fully exited the corresponding separator conveyors. Further, all longitudinal spacings between all adjacent stacks are substantially equal such that the stacks of the set of stacks are substantially equally longitudinally spaced along the flow path when all stacks have been received on the downstream receiving conveyor. This provides a longitudinally offset set of stacks and longitudinally offsets the stacks such that they can be transversely pushed into a single file steam of stacks.

In one embodiment, each separator conveyor is driven at a continuous speed. The continuous speed of each separator conveyor is different than the continuous speed of the rest of the separator conveyors so as to adjust the relative longitudinal positions of the stacks of the set of stacks along the flow path.

In one embodiment, each separator conveyor includes an inlet region. The inlet regions are all positioned at a same longitudinal position along the flow path.

In one embodiment, at least one separator conveyor is driven at a variable speed so as to adjust the relative longitudinal positions of the stacks of the set of stacks along the flow path.

In one embodiment, the plurality of separator conveyors includes a first separator conveyor that has only one other separator conveyor immediately adjacent thereto and a last separator conveyor that has only one other separator conveyor immediately adjacent thereto. The apparatus further includes at least one intermediate separator conveyor having two separator conveyors immediately adjacent thereto. The first separator conveyor discharges its corresponding stack of a set of stacks onto the downstream receiving conveyor prior to the at least one intermediate separator conveyor and the last separator conveyor. The at least one intermediate separator conveyor discharges its corresponding stack of the set of stacks onto the downstream receiving conveyor prior to the last separator conveyor. The last separator conveyor discharges its corresponding stack of the set of stacks onto the downstream receiving conveyor after all other stacks of the set of stacks have been discharged onto downstream receiving conveyor.

In a more particular implementation, the last separator conveyor discharges its stack of the set of stacks onto the downstream receiving conveyor before the first separator conveyor discharges a stack from a next set of stacks on to the downstream receiving conveyor.

In one embodiment, each separator conveyor has an inlet and an outlet. All of the inlets are generally aligned at a first longitudinal position along the flow path that is the same for all of the separator conveyors. All of the outlets are generally aligned at a second longitudinal position along the flow path that is the same for all of the separator conveyors and is downstream from the first longitudinal position by a first distance. Each separator conveyor is configured such that it takes a transport period of time to receive the stack at the inlet and discharge the stack from the outlet. The period of time for each separator conveyor is different such that the stacks are discharged from the separator conveyors in a sequential manner.

In one embodiment, the separator conveyors are provided by paddle conveyors.

A method of separating a set of stacks is also provided. The method includes receiving, by a plurality of separator conveyors, a set of stacks traveling along a flow path. Each stack of the set of stacks is at a same longitudinal position along the flow path and transversely offset from one another along a transverse axis that extends generally perpendicular to the flow path. Each stack in the set of stacks travels along the flow path within a corresponding one of a plurality of parallel lanes. The method further includes sequentially discharging the stacks of the set of stacks such that each stack of the set of stacks is discharged from its corresponding separator conveyor at a different longitudinal position along the flow path from the rest of the stacks of the set of stacks. The method further includes receiving, by a downstream receiving conveyor, each stack of the set of stacks from the plurality of separator conveyors.

In a more particular implementation, sequentially discharging the stacks occurs such that after all stacks of the set of stacks have been discharged from the separator conveyors, adjacent stacks define a longitudinal spacing therebetween. All longitudinal spacings between all adjacent stacks are substantially equal such that the stacks of the set of stacks are substantially equally longitudinally spaced along the flow path when all stacks have been received by the downstream receiving conveyor.

In one embodiment, each separator conveyor has an inlet and an outlet; all of the inlets are generally aligned at a first longitudinal position along the flow path that is the same for all of the separator conveyors. All of the outlets are generally aligned at a second longitudinal position along the flow that is the same for all of the separator conveyors and is downstream from the first longitudinal position by a first distance. The method further comprises transporting each stack from the inlet to the outlet of the corresponding separator conveyor. The step of transporting each stack takes a transport period of time to receive the stack at the inlet and discharge the stack from the outlet. The step of transporting each stack has a different transport period of time for each stack of a set of stacks.

In one embodiment, the step of transporting includes accelerating at least one of the stacks to a speed faster than a speed at which the set of stacks is received by the plurality of separator conveyors.

In one embodiment, the step of transporting includes decelerating at least one of the stacks to a speed slower than a speed at which the set of stacks is received by the plurality of separator conveyors.

Another feature of embodiments of the invention includes a merger apparatus for merging a stream of stacks flowing in a plurality of parallel lanes of stacks along a flow path into a single file stream of stacks. The plurality of lanes of stacks including a first lane and at least one offset lane transversely offset from the first lane in an offset direction generally perpendicular to the flow path. The stacks are longitudinally spaced apart along the flow path.

The merger apparatus includes a conveyor belt configured to receive the stream of stacks with the stacks flowing in the parallel lanes of stacks at an upstream end with the stacks flowing parallel to the flow path and longitudinally spaced apart along the flow path. The conveyor belt has a conveyor belt longitudinal speed in a longitudinal direction parallel to the flow path. The merger apparatus further includes a transverse merger mechanism vertically above the conveyor belt including a plurality of sweeper paddles. The paddles traveling along a pathway that has a longitudinal component that is generally parallel to the flow path and a transverse component that is generally perpendicular to the flow path and opposite the offset direction. The transverse merger mechanism is configured relative to the conveyor belt such that the paddles engage a side of each stack in the at least one offset lane and transversely push each engaged stack transversely across the conveyor belt and into the single file stream of stacks. The single file stream of stacks including the stacks of the first lane.

In one embodiment, the paddles have a paddle longitudinal speed component parallel to the longitudinal direction substantially equal to the conveyor belt longitudinal speed.

In another embodiment, the at least one offset lane includes a plurality of offset lanes including a last lane that is offset transversely the furthest away from the first lane. The pathway of the paddles is generally angled relative to the flow path such that the stacks in the last lane are engaged by a paddle prior to any of the stacks downstream from the engaged stack within the corresponding set of stacks.

In one embodiment, each stack in the first lane is a downstream most stack of a set of stacks and each stack in the last lane is an upstream most stack of the set of stacks.

In one embodiment, the single file stream of stacks exits the transverse merger mechanism with all stacks traveling in the longitudinal direction along the flow path.

In one embodiment, the sweeper paddles remain in a substantially constant orientation while engaged with a corresponding stack. In a more particular embodiment, the pathway of the sweeper paddles is a closed loop pathway.

In one embodiment, the transverse merger mechanism includes a drive arrangement configured to drive the paddles along the closed loop pathway. The paddles are operably connected to the drive arrangement to pivot relative to the drive mechanism about an axis that is generally perpendicular to the transverse direction and the flow path.

A method of merging a stream of stacks is also provided. The method includes carrying, using a conveyor belt, a stream of stacks to a transverse merger mechanism. The stream of stacks flow in a plurality of parallel lanes of stacks along a flow path. The plurality of lanes of stacks includes a first lane and at least one offset lane transversely offset from the first lane in an offset direction generally perpendicular to the flow path. The stacks are longitudinally spaced apart along the flow path such that the stacks form repeating sets of stacks. The conveyor belt has a conveyor belt longitudinal speed in a longitudinal direction parallel to the flow path. The method further includes transversely pushing, at least, the stacks in the at least one offset lane transversely across the conveyor belt and into a single file stream of stacks including the stacks of the first lane while the stacks travel longitudinally along the flow path such that the velocity vector of the packs prior to engagement with the transverse mechanism and after being released therefrom is substantially identical.

In a more particular method, the transverse merger mechanism includes a plurality of sweeper paddles traveling along a pathway that has a longitudinal component that is generally parallel to the flow path and a transverse component that is generally perpendicular to the flow path and opposite the offset direction. The step of transversely pushing includes engaging a transverse side of each of the pushed stacks with a corresponding paddle of the transverse merger mechanism.

In one method, the paddles have a paddle longitudinal speed component in the longitudinal direction substantially equal to the conveyor belt longitudinal speed.

In one method, the at least one offset lane includes a plurality of offset lanes including a last lane that is offset transversely the furthest away from the first lane. The pathway of the paddles is angled relative to the flow path such that engaging a transverse side of each of the pushed stacks includes engaging the transverse side of the stacks in the last lane prior to engaging any of the stacks downstream from the engaged stack within the corresponding stepped set of stacks.

In another method, each stack in the first lane is a downstream most stack of a stepped set of stacks and each stack in the last lane is an upstream most stack of a stepped set of stacks.

Another feature of embodiments includes a cutoff apparatus for cutting a plastic sleeve between adjacent spaced stacks of sheet like products positioned within the plastic sleeve. The plastic sleeve and spaced stacks of sheet like products move longitudinally along a flow path. The cutoff apparatus includes a drive motor, a rotating arm, a first heated cutting element and a power supply. The rotating arm is operably coupled to the drive motor for rotation of the rotating arm about a rotational axis. The first heated cutting element is attached to the rotating arm. The power supply is operably attached to the heated cutting element to adjust a current flowing through the heated cutting element. The power supply is configured to operably adjust the current flowing through the heated cutting element in relation to a rotational speed of the rotating arm about the rotational axis.

In one embodiment, the first heated cutting element is operably pivotally attached to the rotating arm such that the first heated cutting element is maintained at a substantially constant orientation as the rotating arm rotates about the rotational axis.

In another embodiment, a cutoff apparatus for cutting a plastic sleeve between adjacent spaced stacks of sheet like products positioned within the plastic sleeve. The plastic sleeve and spaced stacks of sheet like products moving longitudinally along a flow path. The cutoff apparatus includes a drive motor, a rotating arm, and a first heated cutting element. The rotating arm is operably coupled to the drive motor for rotation of the rotating arm about a rotational axis. The first heated cutting element is operably pivotally attached to the rotating arm such that the first heated cutting element is maintained at a substantially constant orientation as the rotating arm rotates about the rotational axis.

In one embodiment, the cutoff apparatus further includes a second heated cutting element operably pivotally attached to the rotating arm such that the second heated cutting element is maintained at a substantially constant orientation as the rotating arm rotates about the rotational axis.

In one embodiment, the first and second heated cutting elements are operably pivotally attached at opposite ends of the rotating arm and on opposite sides of the rotational axis.

In one embodiment, the cutoff apparatus further includes a power supply operably attached to the first heated cutting element to adjust a current flowing through the first heated cutting element. The power supply is configured to operably adjust the current flowing through the first heated cutting element in relation to a rotational speed of the rotating arm about the rotational axis.

In one embodiment, the rotational axis extends at a non-parallel oblique angle relative to the flow path. The rotational axis is oriented relative to the flow path such that the first heated cutting element travels in a downstream direction along the flow path as the first heated cutting element cuts the plastic sleeve. In a more particular embodiment, the non-parallel oblique angle is correlated relative to a flow rate of the sleeve of plastic along the flow path such that the first heated cutting element makes a cut through the sleeve of plastic that is substantially perpendicular to the sleeve.

In one embodiment, the cutoff apparatus further includes a support base, a rotational axis adjustment mechanism, and a rotating arm drive shaft that rotates about the rotational axis and is operably connected to the rotating arm. The rotational axis adjustment mechanism is operably coupled between the rotating arm drive shaft and the support base and is configured to rotate the rotating arm drive shaft about an adjustment axis that is perpendicular to the rotational axis so as to adjust the angle of the rotational axis relative to the flow path.

In one embodiment, the cutoff apparatus further includes a stack sensor configured to sense the positions of adjacent stacks between which the first heated cutting element passes. The apparatus further including a controller configured to adjust the motion of the first heated cutting element such that the first heated cutting element passes substantially half way between the adjacent stacks.

In another aspect, a turner apparatus is provided. The turner apparatus changes the direction of motion of units of product without changing the orientation of the units. The turner includes a carousel and a plurality of sleeved stack control mechanisms. The carousel is rotatable about a carousel axis of rotation. Each sleeved stack control mechanism is carried by the carousel for rotation about a sleeved stack control mechanism axis of rotation of the corresponding sleeved stack control mechanism. Each sleeved stack control mechanism is configured such that as the carousel rotates the sleeved stack control mechanism along a predetermined arcuate path through a predetermined carousel angle about the carousel axis of rotation in a first angular direction. The sleeved stack control mechanism rotates about the sleeved stack control mechanism axis of rotation of the corresponding sleeved stack control mechanism in a second angular direction being opposite the first angular direction through a sleeved stack control mechanism angle equal to the predetermined carousel angle such that the orientation of each sleeved stack control mechanism remains constant as the sleeved stack control mechanism is carried along the predetermined arcuate path. The arcuate path could be elliptical or a portion of circle or otherwise generally curved.

In one embodiment, the turner further includes a transport conveyor upstream of the carousel. The transport conveyor supplies a continuous stream of spaced apart units having a downstream end and an upstream end with a longitudinal unit axis extending between the downstream and upstream ends. The units additionally have a transverse unit axis extending generally perpendicular to the longitudinal unit axis. Each unit includes a stack of sheets within a plastic sleeve. The continuous stream of spaced apart units travel along a feed path axis with the longitudinal unit axis generally parallel to the feed path axis and the transverse unit axis perpendicular to the feed path axis. The apparatus further includes a discharge conveyor downstream of the carousel. The carousel discharges the continuous stream of spaced apart units from the sleeved stack control mechanisms onto the discharge conveyor along a discharge path having a discharge path axis that extends at a non-zero angle relative to the feed path axis. The carousel discharges the continuous stream of spaced apart units with the longitudinal unit axis of each unit extending generally parallel to the feed path axis and perpendicular to the discharge path axis, as well as, with the transverse unit axis parallel to the discharge path axis.

In one embodiment, the predetermined carousel angle is approximately ninety degrees. In other embodiments, the angle is between about 45 and 135 degrees.

In one embodiment, each sleeved stack control mechanism includes a control mechanism suction apparatus for vacuum grabbing the top surface of the units. A valve arrangement operably opens the suction apparatus to a vacuum.

In one embodiment, each sleeved stack control mechanism is operably attached to the carousel for linear reciprocating motion parallel to the sleeved stack control mechanism axis of rotation, i.e. vertically up and down.

In one embodiment, the apparatus further includes a cam arrangement between the sleeved stack control mechanisms and the carousel configured to transition each sleeved stack control mechanism vertically downward prior to the sleeved stack control mechanism grabs a unit proximate a beginning of the arcuate path and to raise the sleeved stack control mechanism upward and away from a unit proximate an end of the arcuate path.

In a further embodiment, a turner apparatus including a carousel and a plurality of sleeved stack control mechanisms is provided. The carousel is rotatable about a carousel axis of rotation. Each sleeved stack control mechanism is carried by the carousel for rotation about a sleeved stack control mechanism axis of rotation of the corresponding sleeved stack control mechanism. Each sleeved stack control mechanism is configured relative to the carousel such that as the carousel translates the sleeved stack control mechanism along a predetermined path, the sleeved stack control mechanism rotates about the sleeved stack control mechanism axis of rotation of the corresponding sleeved stack control mechanism 90 degrees relative to the carousel.

In one embodiment, a cam arrangement is positioned between the sleeved stack control mechanisms and the carousel to effectuate the 90 degree rotation of the sleeved stack control mechanisms.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4 is a side elevation illustration of a portion of the pack forming system illustrated in FIG. 1;

FIG. 9 is a top perspective illustration of a turner apparatus for changing the direction of units of product by 90 degrees;

FIGS. 10 and 11 illustrate an alternative embodiment of the invention illustrated in FIGS. 1 and 4;

FIG. 12 is a side schematic illustration of the cutting path of the hot wire cutoff apparatus of FIG. 7.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
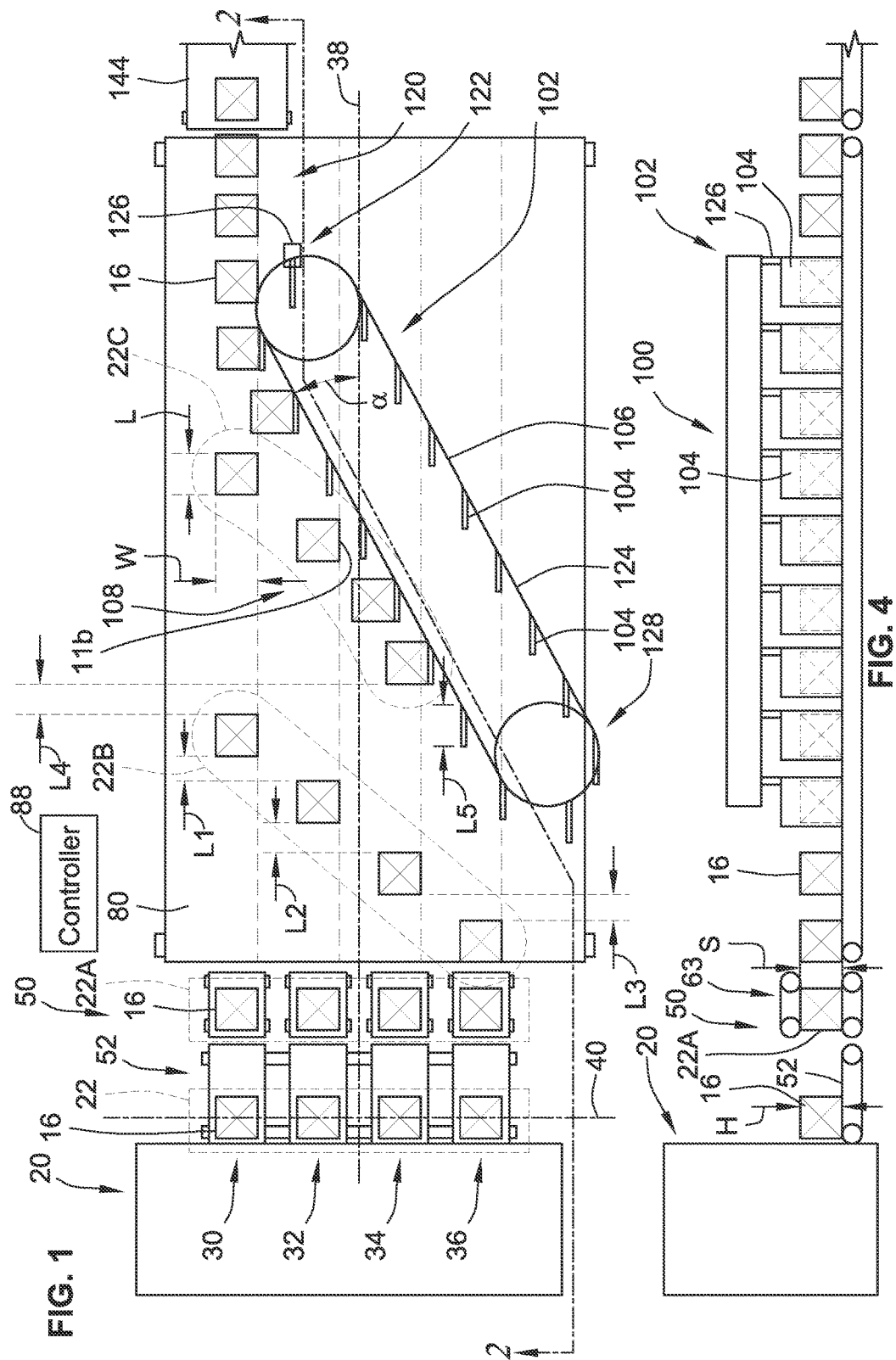
FIGS. 1 and 2 are a schematic representation of a pack forming system for forming packs of sheet like product.
Figure 2:
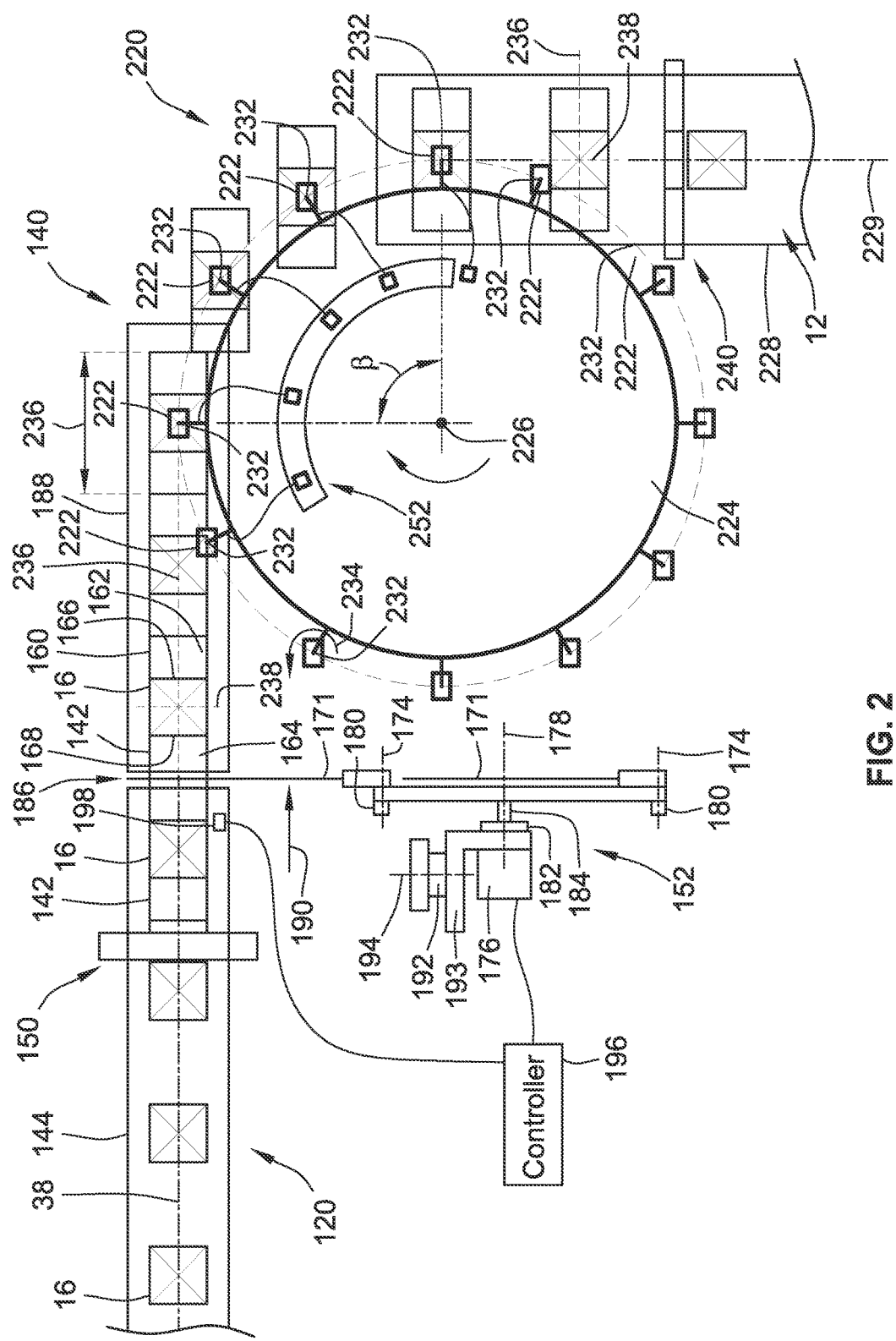

FIGS. 1 and 2 illustrate a schematic simplified illustration of a pack forming system 10 according to an embodiment of the present invention. The pack forming system 10 is a full system for forming packs of stacked sheet like product packaged in a heat sealable plastic sleeve (see e.g. reference numeral 12 in FIG. 2), such as for example napkins, paper towels or facial tissues. The pack forming system 10 is not limited to these examples and, for example, could be used with other products such as sheets of wax paper, tissue paper, or tin/aluminum foil. Further, other embodiments could use other types of sleeves for forming the wrapper of the packs 12. The stacks of sheet like product could have interfolded sheets, folded sheets, zig-zag folded sheets, non-folded sheets or other forms of product.

The pack forming system 10 generally includes a stack forming apparatus 20 for forming stacks of sheet like product 16 (also referred to herein as "stacks of product 16" or simply "stacks 16"). The reference numeral 16 will be used to refer generically to stacks of sheet like product. Other reference numerals may be used to refer to specific stacks of sheet like product. The stack forming apparatus 20 could include any number of forming apparatuses and could include, for example, an interfolder, a folder or a zig-zag folder for forming the product. The stack forming apparatus 20 will typically form a continuous stream of product that will ultimately be formed into individual stacks 16.

The stack forming apparatus 20 will typically include a separator apparatus for separating the stream of product into the individual stacks 16. For instance, the separator apparatus could take the form of a starwheel separator, a plurality of interacting fingers, such as count fingers, build fingers, strip fingers, etc., or substantially any other mechanism for separating a continuous stream of product into separate discrete stacks of product.

In the illustrated embodiment, the stack forming apparatus 20 has four (4) lanes 30, 32, 34, 36 for forming stacks 16. More or less lanes can be used in other embodiments.

The stacks 16 exit the stack forming apparatus 20 as a set of stacks 22 (also referred to as "set 22" particular sets may also be identified) and flow longitudinally along a flow path 38 defined by the four lanes 30, 32, 34, 36 in a longitudinal direction downstream and away from the stack forming apparatus 20. The continuous flow of sets 22 forms a stream of sets flowing along the flow path 38. The lanes 30, 32, 34, 36 are transversely offset from one another along a transverse axis 40 that is generally perpendicular to the flow path 38. As such, when formed, the sets 22 include a plurality of transversely offset stacks 16 that are positioned substantially at an equal longitudinal position along the flow path 38. Each set 22 includes one stack 16 within a corresponding one of the lanes 30, 32, 34, 36.

The sets 22 travel downstream from the stack forming apparatus 20 to a stack separator apparatus 50 (see also FIG. 3) for adjusting the relative longitudinal positions of the stacks 16 such that each stack 16 within a given set 22 is longitudinally offset from the rest of the stacks 16 within the set along the flow path 38. This allows downstream operations to converge the stacks 16 into a continuous single file stream of stacks 120 as will be more fully described below.

Figure 3:
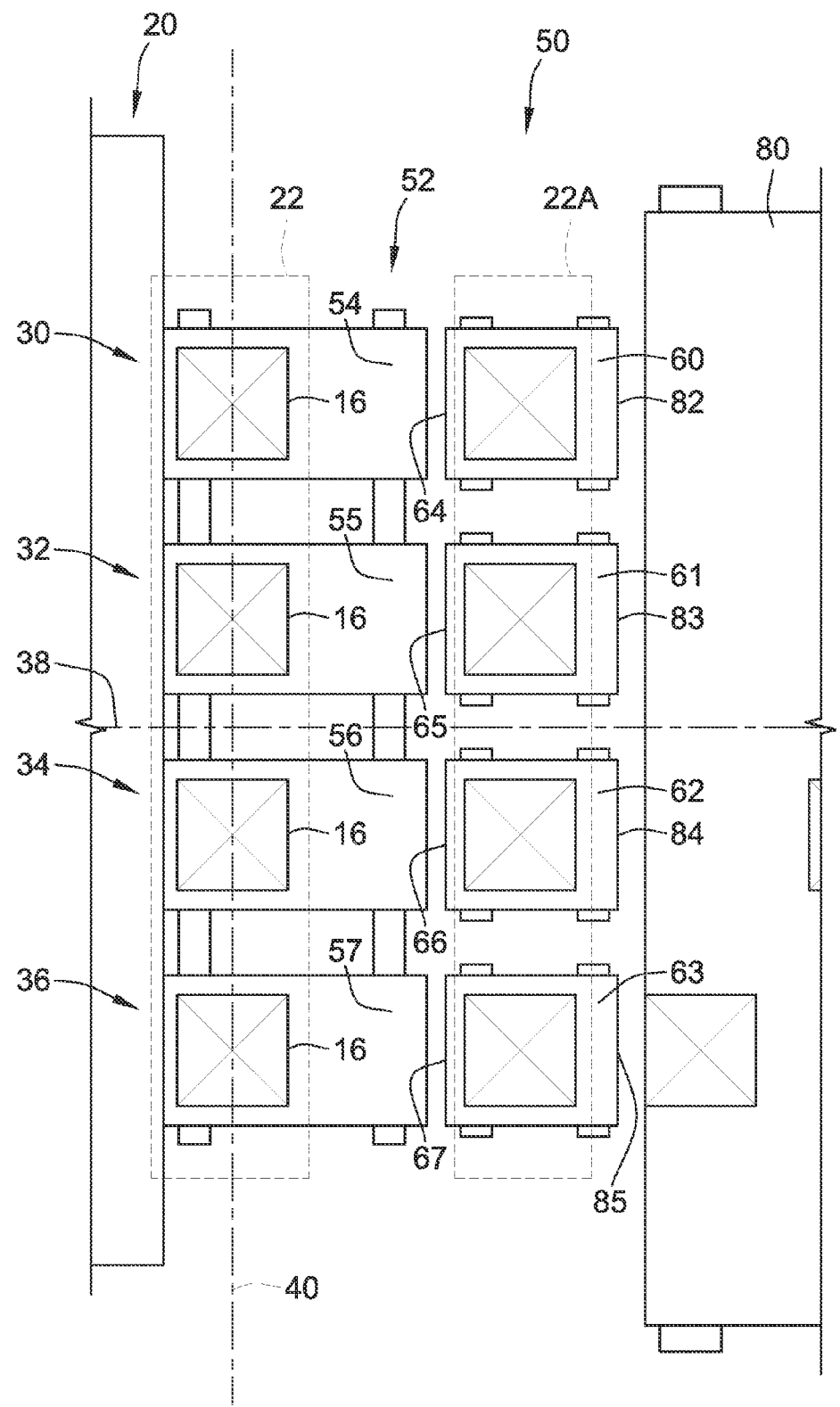
FIG. 3 is an enlarged schematic illustration of a stack separator apparatus of the pack forming system of FIGS. 1 and 2.

With principle reference to FIG. 3 and supplemental reference to FIG. 1, a discharge conveyor arrangement 52 downstream from the stack forming apparatus 20 receives the individual sets 22 and transports the sets 22 to the stack separator apparatus 50 at an in-feed speed. The discharge conveyor arrangement 52 in the illustrated embodiment includes a plurality of discharge conveyor belts 54-57 that are transversely offset from one another such that each belt is aligned with a corresponding one of the lanes 30, 32, 34, 36. The discharge conveyor belts 54-57 could, in alternative embodiments, take the form of a single wide discharge conveyor belt that is wide enough to support each lane of stacks. Further yet, when using individual belts, the belts could be driven together, such as illustrated, or be independently driven from one another. The discharge conveyor belts could also take the form of a paddle conveyor and, particularly, in the form of pushers over one or more dead plates (i.e. one or more fixed tables).

The stack separator apparatus 50 includes a plurality of separator conveyors 60-63 that are downstream from the discharge conveyor arrangement 52. Each separator conveyor 60-63 aligns with a corresponding lane 30, 32, 34, 36, respectively. Because the stacks 16 in a set are aligned at a same longitudinal position on the discharge conveyor arrangement 52, each stack 16 of a set 22 is received by the stack separator apparatus 50 at substantially a same time at inlets 64-67 thereof from the discharge conveyor arrangement 52. All inlets 64-67 are preferably longitudinally positioned at a same position along the flow path 38.

After receiving a set of stacks, such as set 22A, the stack separator apparatus 50, and particularly the separator conveyors 60-63, is configured to sequentially discharge each stack 16 of each set 22 onto a downstream receiving conveyor 80 (see e.g. FIG. 1). The downstream receiving conveyor 80 is positioned adjacent to and downstream from outlets 82-85 of the separator conveyors 60-63. Outlets 82-85 are preferably positioned at a same longitudinal position along flow path 38. In the illustrated embodiment, the downstream receiving conveyor 80 is a single wide belt.

Figure 5:
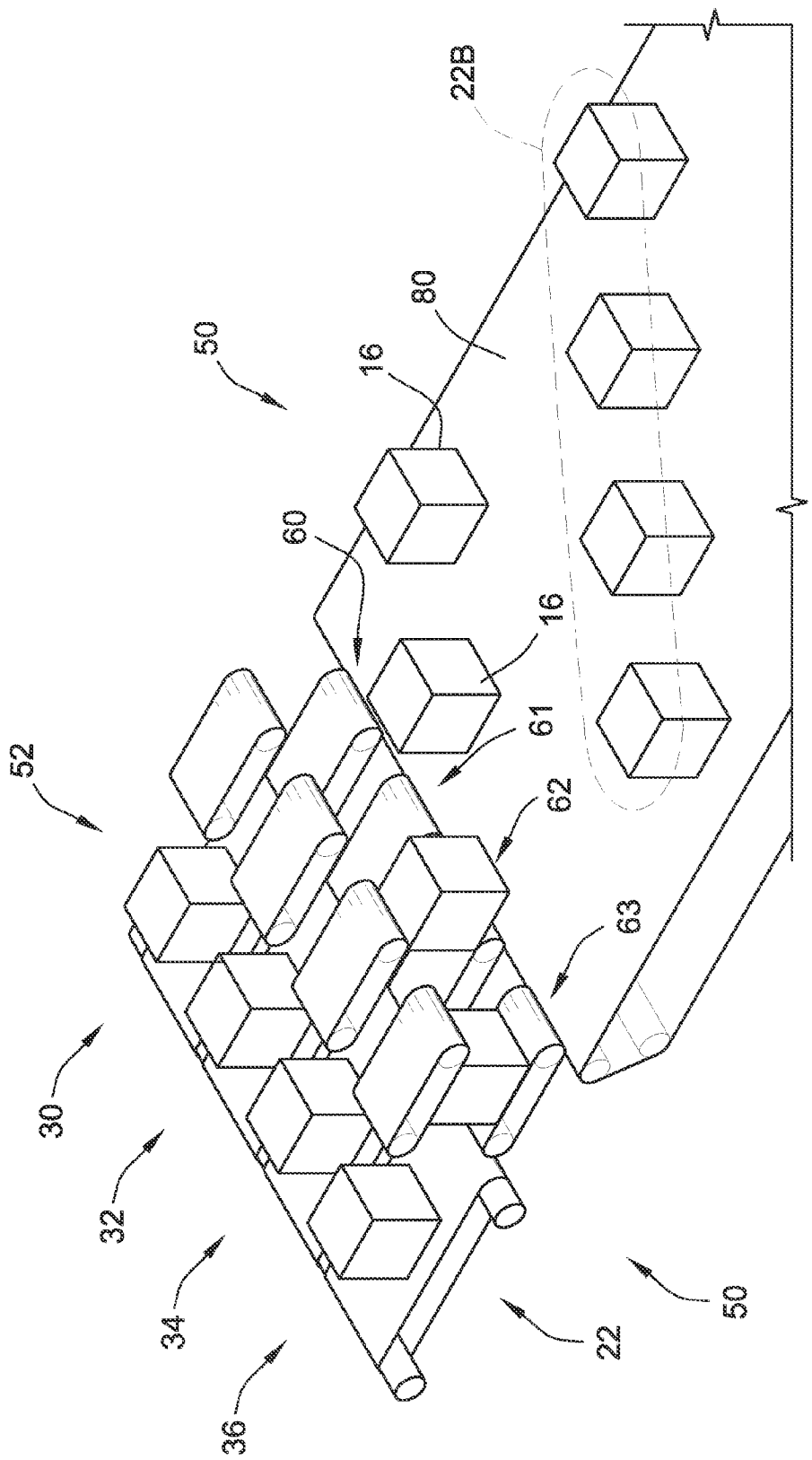
FIGS. 5 and 6 are top perspective illustrations of a stack separator apparatus for separating aligned stacks of set of stacks into a longitudinally offset stepped configuration.

With reference to FIGS. 4 and 5, in the illustrated embodiment, each separator conveyor 60-63 includes a pair of vertically offset belts. By using a top and bottom belt arrangement, the stacks 16 can be more securely controlled by the individual separator conveyors 60-63 because the tops and bottoms of the stacks 16 can be engaged by the separator conveyors 60-63. Preferably, the pairs of belts are vertically adjustable relative to one another. Typically, the top belt is vertically adjustable, so that the vertical spacing S (FIG. 4) between the belts is adjustable to accommodate different stack heights H. In alternative embodiments where the stacks are very tall, paddle conveyors could be used rather than the pairs of parallel belts.

Each separator conveyor 60-63 is independently controllable such that the linear speed and acceleration of each separator conveyor 60-63 can be controlled independent of the rest of the separator conveyors 60-63. The independent control allows for adjusting the discharge of the individual stacks 16. The separator conveyors 60-63 are connected to a controller that can control the actuation thereof.

With reference to FIGS. 1 and 4, the stacks 16 of a set of stacks 22, are discharged sequentially such that each stack 16 of the set of stacks 22 is discharged from its corresponding separator conveyor 60-63 at a different longitudinal position along the flow path 38 from the rest of the stacks 16 of the set 22. Further yet, none of the stacks 16 are discharged onto the downstream receiving conveyor 80 at a same longitudinal position along the flow path 38 as any other stack, i.e. from an upstream or downstream set 22, at that same time. As such, once a stack 16 is discharged from the stack separator apparatus 50, it is longitudinally offset from all other stacks 16 along flow path 38 such that there is not any other stack 16 at the same longitudinal position along the flow path 38 as that stack 16 once it has exited the stack separator apparatus 50. This allows for subsequent downstream processing of the stacks 16 into a single file stream of stacks 120.

With reference to FIG. 1, adjacent stacks 16 define a longitudinal spacing therebetween, such as longitudinal spacings L1, L2, L3, after both of the adjacent stacks 16 have been discharged from their corresponding discharge conveyors 60-63. Preferably, all longitudinal spacings L1, L2, L3 between adjacent stacks are substantially equal to provide equal longitudinal spacing along flow path 38 after all stacks 16 have been received on the downstream receiving conveyor 80.

The last stack discharged from a set 22, i.e. from separator conveyor 63 has a longitudinal spacing L4 from the first stack discharged from a subsequent set 22, i.e. from separator conveyor 60 equal to the longitudinal spacings L1, L2, L3 between adjacent stacks within a set such that all stacks within the stream of stacks are equally longitudinally spaced after being discharged onto the downstream receiving conveyor 80.

After being discharged onto the downstream receiving conveyor 80, each set 22, such as set 22B, has a longitudinally offset configuration of all stacks and particularly a stepped configuration in the illustrated embodiment. However, in other implementations, the stacks of a set need not be offset in the stepped configuration only that the individual stacks be longitudinally offset. The stack separator apparatus 50 in the illustrated embodiment outputs a stream of sets 22, each in the stepped configuration. However, other longitudinally offset configurations can be used.

Separator conveyor 60 has only one other separator conveyor 61 immediately transversely adjacent thereto. Similarly conveyor 63 has only one other separator conveyor 62 immediately transversely adjacent thereto. These separator conveyors 60, 63 align with the laterally outermost lanes 30, 36. Separator conveyors 61, 62 are transversely positioned between separator conveyors 60, 62 and separator conveyors 61, 63, respectively, and may also be referred to as "intermediate separator conveyors."

As noted above, the separator conveyors 60-63 are configured to sequentially discharge a corresponding stack 16 from each set 22 in order when moving transversely along or otherwise parallel to transverse axis 40 from separator conveyor 60 to separator conveyor 63. As such, separator conveyor 60 discharges its stack 16 prior to the rest of the stacks 16 within a set. Separator conveyor 63 discharges its stack 16 after the rest of the stacks 16 within the set 22 have been discharged onto downstream receiving conveyor 80. The intermediate separator conveyors 61, 62 discharge after separator conveyor 60 but prior to separator conveyor 63. Further, separator conveyor 63 discharges its stack 16 from a set 22B prior to separator conveyor 60 discharges a stack from a subsequent, upstream, set 22A.

The separator conveyors 60-63 may be controlled to sequentially accelerate their corresponding stacks so as to properly discharge the stacks with equal longitudinal spacing as discussed above. The speed of a stack may not be constant when the stack is fully controlled by a separator conveyor 60-63. Because all of the separator conveyors 60-63 generally receive a stack 16 at a same time, separator conveyor 63 must delay discharging its stack 16 until separator conveyors 60-62 have all discharged the corresponding stacks 16, at least in the illustrated embodiment that produces the stepped configuration. Separator conveyor 63 could delay discharging the stack in several ways. When the pack is fully controlled by separator conveyor 63, separator conveyor 63 could completely stop the motion of the corresponding stack and then accelerate the stack rapidly. Separator conveyor 63 could slow down the speed or maintain the speed of the corresponding stack such that it does not stop and then properly accelerate the stack. This acceleration and/or deceleration could be applied to all or some of the other separator conveyors 60-62 so as to properly maintain the relative discharge timing of the stacks 16 from the relative separator conveyors.

Figure 6:
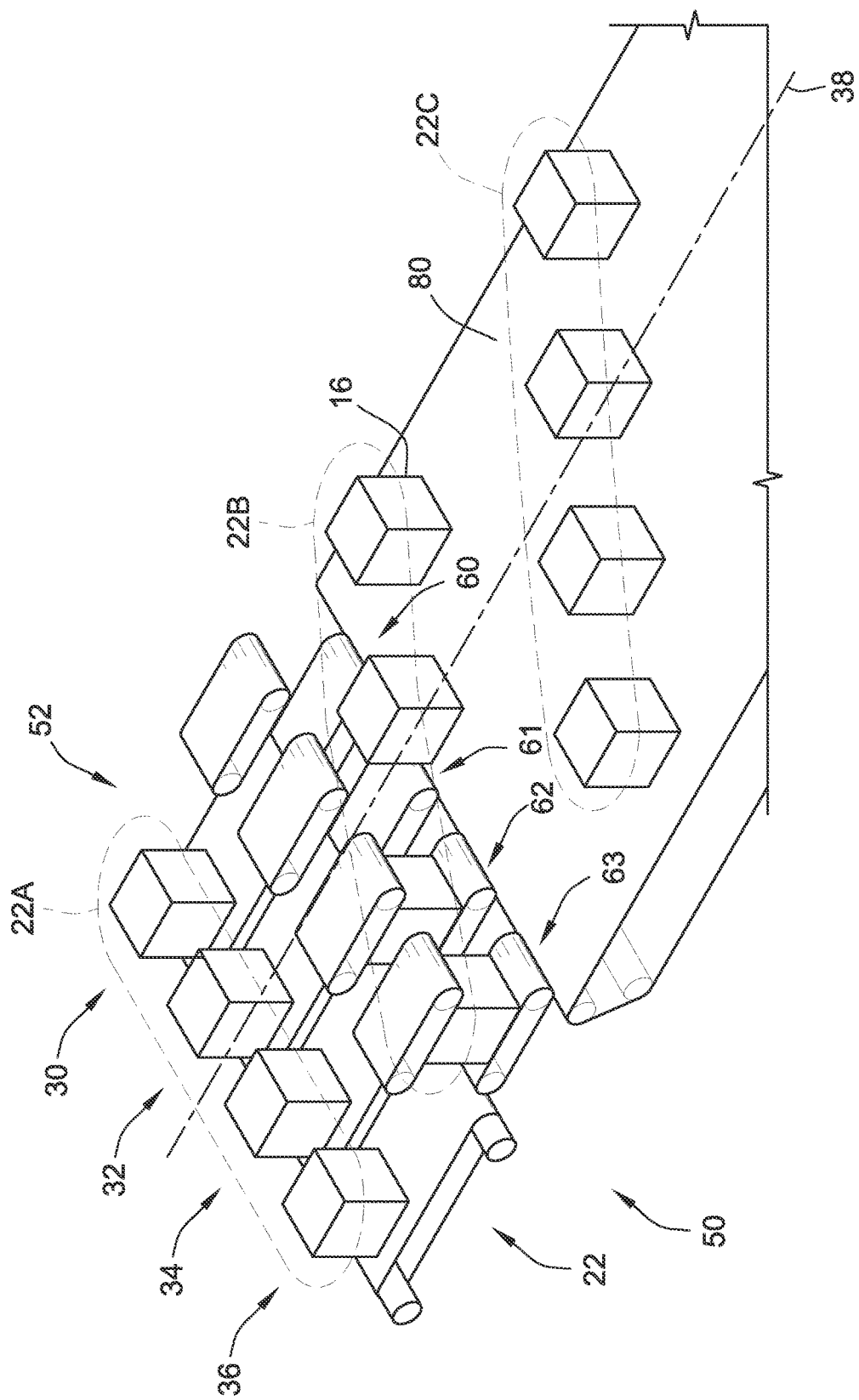

With reference to FIG. 6, the stack separator apparatus 50 has discharged the first two stacks 16 of set 22B. These are the stacks 16 within lanes 30 and 32, respectively. However, the remaining two stacks 16 in the set 22B are being controlled by the separator conveyors 62, 63 aligned with their corresponding lanes 34, 36. In this configuration, the stacks 16 within the separator conveyors 62, 63 are at a same longitudinal position along flow path 38. This is because the separator conveyors 60-63 are configured to hold the stacks 16 until it is the necessary time to begin acceleration thereof to properly discharge the corresponding stack 16. For instance, each separator conveyor 60-63, once discharge has been initiated, may be configured to drive each stack 16 for a same period of time at a same rate. However, the times at which each separator conveyor 60-63 begins discharging its corresponding stack may be offset in time so as to provide the desired longitudinally offset configuration.

In one embodiment, the separator conveyor belts are all run at substantially constant, but different, speeds with the speeds decreasing when moving transversely across the lanes 30, 32, 34, 36 from the first lane 30 to the last lane 36 such that the last separator conveyor 63 runs at a slower speed than all other separator conveyors 60-62 while the first separator conveyor 60 runs at a faster speed than all other separator conveyors 61-63.

In other words, each separator conveyor 60-63 defines a transport period of time which is the amount of time that lapses from when a separator conveyor 60-63 receives a stack 16 at its inlet and then discharges the stack 16 from its outlet. The separator conveyors 60-63 are controlled, such as by controller 88 (FIG. 1), such that the transport periods of time are all different and increase when moving transversely from separator conveyor 60 to separator conveyor 63 in substantially equal increments. Again, the order from the first to the last lane need not create a perfectly stepped offset configuration of the stacks.

The separator conveyors, depending on the configuration, can be configured to run faster than, slower than or at the same speed as the discharge conveyor arrangement 52 or the downstream receiving conveyor 80.

Once the stacks 16 are discharged from the stack separator apparatus 50 onto the downstream receiving conveyor 80, the stacks 16 travel in their corresponding lanes 30, 32, 34, 36 downstream to a stack merger apparatus 100. The stacks 16 travel in the longitudinally offset configuration with all stacks substantially evenly longitudinally spaced apart along the flow path 38 such that a continuous stream of longitudinally offset stacks flows along the flow path 38. To reiterate that which has been discussed above, this even spacing applies to both stepped configurations or non-stepped configurations and applies when viewing the stacks from the side such as in FIG. 4. It does not matter which lane 30, 32, 34, 36 has the longitudinally first stack or the longitudinally last stack, just that when viewed from the side, the stacks are substantially evenly longitudinally spaced, such as illustrated in FIG. 4.

With reference to FIGS. 10 and 11, the even longitudinal spacing need not be between stacks in immediately laterally adjacent lanes, only between longitudinally adjacent stacks. FIG. 10 illustrates a set 22B' that has the non-stepped configuration. Here, the distance L1 is between stack 16A in lane 30 and stack 16B in lane 34. Here, the stacks 16A and 16B are not laterally adjacent to one another. These stacks 16A and 16B would be considered to be longitudinally adjacent, as illustrated in FIG. 11, because they are adjacent to one another when viewed along the longitudinal flow path 38. Similarly, distance L3 is between stack 16C in lane 32 and stack 16D in lane 36. As such, stacks 16C and 16D would be longitudinally adjacent to one another, because they are adjacent to one another when viewed along flow path 38.

The stack merger apparatus 100 is configured to convert the plurality of parallel lanes 30, 32, 34, 36 of stacks traveling along the flow path into a single file stream of stacks 120, see generally downstream of the stack merger apparatus 100 in FIG. 1.

The stack merger apparatus 100 includes a transverse merger mechanism 102 positioned vertically above the downstream receiving conveyor 80. The transverse merger mechanism 102 includes a plurality of sweeper paddles 104 (also referred to as "paddles 104"). The sweeper paddles 104 travel along a closed loop pathway 106 (also referred to as "pathway 106").

The closed loop path way 106 includes an intersection portion 108 that intersects the plurality of parallel lanes 30, 32, 34, 36 at a non-zero merger mechanism angle α. As such, the paddles 104 travel along the intersection portion 108 of the pathway 106 with a longitudinal component that extends parallel to the flow path 38 as well as a transverse component that is generally perpendicular to the flow path 38, and consequently lanes 30, 32, 34, 36. The transverse component extends in a direction extending generally parallel to transverse axis 40 and from lane 36 towards lane 30 with reference to the downstream direction along the flow path 38.

The paddles 104 are guided along the intersection portion 108 with a speed component parallel to the flow path 38 that is substantially equal the speed of the downstream receiving conveyor 80.

As the paddles 104 travel along the intersection portion 108 in the downstream direction, each paddle 104 aligns with a corresponding stack 16 at a same longitudinal position along the flow path 38. As the paddles 104 move downstream along the intersection portion 108, the paddles 104 move transversely towards lane 30. As the paddles 104 move transversely, each paddle 104 aligns with a stack in at least the lanes 32, 34, 36 and engages a transverse side 116 of the aligned stack 16. The paddles 104 push the corresponding aligned stack transversely across the downstream receiving conveyor 80 towards lane 30 into a single file stream of stacks 120 that includes the stacks 16 that were originally traveling in lane 30. The stacks 16 slide across a top surface of the downstream receiving conveyor 80 as they move in the transverse direction.

In some embodiments, the transverse merger mechanism 102 does not adjust the transverse position of the stacks 16 within first lane 30 such that they always travel along a straight linear path. In alternative embodiments, the transverse merger mechanism 102 transversely engages the stacks flowing within lane 30 and transversely offsets these stacks 16 as well so as to better assure the accuracy of the transverse position of all stacks flowing downstream from the stack merger apparatus 100.

Some limited differential speed is permitted in the longitudinal direction between the paddles 104 and the downstream receiving conveyor 80 if the longitudinal length L5 of the paddles 104 is sufficiently long that the stacks 16 do not disengage the paddles 104 prior to the stacks 16 being placed within the single file stream. However, this variation in speed is not preferable and can result to distortion in the stacks as well as inconsistent spacing between adjacent stacks 16 downstream from the transverse merger mechanism 102.

It is beneficial to have the paddles 104 maintain a constant orientation at all times when engaged with a stack 16. To do so, the paddles 104 maintain a constant orientation relative to the stacks 16 (as well as parallel to flow path 38 in the illustrated embodiment) when passing around arcuate distal end 122 of the transverse merger mechanism 102 and the closed loop pathway 106 proximate the single file stream of stacks 120. As such, the paddles 104 are preferably attached to a corresponding drive mechanism, such as a drive belt 124 that defines closed loop pathway 106 by a swivel joint 126 (shown schematically in FIGS. 1 and 4). The swivel joint 126 allows the paddles 104 to rotate about a paddle rotational axis that is generally perpendicular to the flow path 38 and the transverse axis 40. The paddles 104 can also cooperate with a cam, at least at distal end 122, so as to maintain the proper orientation as the paddles 104 transition from pushing the stacks 16 towards the single file stream 120 to returning back towards opposite, upstream distal end 128 where the paddles 104 will return to repeat the cycle.

The merger mechanism angle a in the illustrated embodiment is such that the pack 16 in the last lane 36 is engaged by a corresponding paddle 104 prior to any of the other stacks 16 within the corresponding set of stacks 22 (see set 22C in FIG. 1). The remaining unengaged stacks 16 wit in the set 22 will be sequentially engaged by their corresponding paddles 104 in sequential order starting with the lane 34 furthest from lane 30. Again, this is if the stepped configuration is used. However, the order of engagement can be altered.

The more the merger mechanism angle α deviates from being perpendicular to flow path 38; the more the transverse speed component of the paddles 104 is reduced. It is preferred that the merger mechanism angle α is between about 25 and 75 degrees and more preferably between about 30 and 45 degrees. If the merger mechanism angle α is too small, i.e. closer to parallel to flow path 38, the stack merger apparatus 100 will become unnecessarily long and complex. If the merger mechanism angle α is too large, i.e. closer to perpendicular to flow path 38, the transverse speed component of the sweeper paddles 104 becomes much larger and can create larger impact forces between he paddles 104 and the stacks 16 when they engage one another during the merging process.

Once the stacks 16 have been merged into the single file stream of stacks 120, the stacks 16 are ready to be wrapped. The stacks 16 will be fed to a wrapping apparatus 140, which is generally and schematically illustrated in FIG. 2. The wrapping apparatus 140 is downstream from the stack merger apparatus 100. Here, the longitudinally spaced apart stacks 16 will be inserted into a continuous plastic sleeve 142. The sleeve 142 will be cut between adjacent stacks 16 and then the free ends 162, 164 of the sleeve 142 will be folded. The free ends 162, 164 will then be sealed to finish the wrapping process.

In the illustrated embodiment, an in-feed conveyor 144 is downstream of the downstream receiving conveyor 80 discussed above (see also FIG. 1). The in-feed conveyor 144 feeds the single file stream of stacks 120 to a sleeving arrangement 150 where the individual stacks 16 are inserted into the plastic sleeve 142.

The sleeve 142 and stacks 16 inserted therein continue to travel downstream from the sleeving arrangement 150 to a cutoff apparatus 152 that severs the continuous plastic sleeve 142 between adjacent stacks 16 to form individual units 160 that takes the form of a sleeved stack, which includes a stack 16 positioned within a segment of plastic sleeve 142.

Each unit 160 will have a downstream lead portion 162 (also referred to as a "free end") and an upstream trail portion 164 (also referred to as a "free end") of the plastic sleeve 142 that extend longitudinally outward and axially beyond a lead end 166 and trailing end 168 of the corresponding stack 16. These free ends 162, 164 are open ends of the segment of sleeve 142 and will ultimately be folded around the stack 16 and welded to form completed packs 12.

Figure 7:
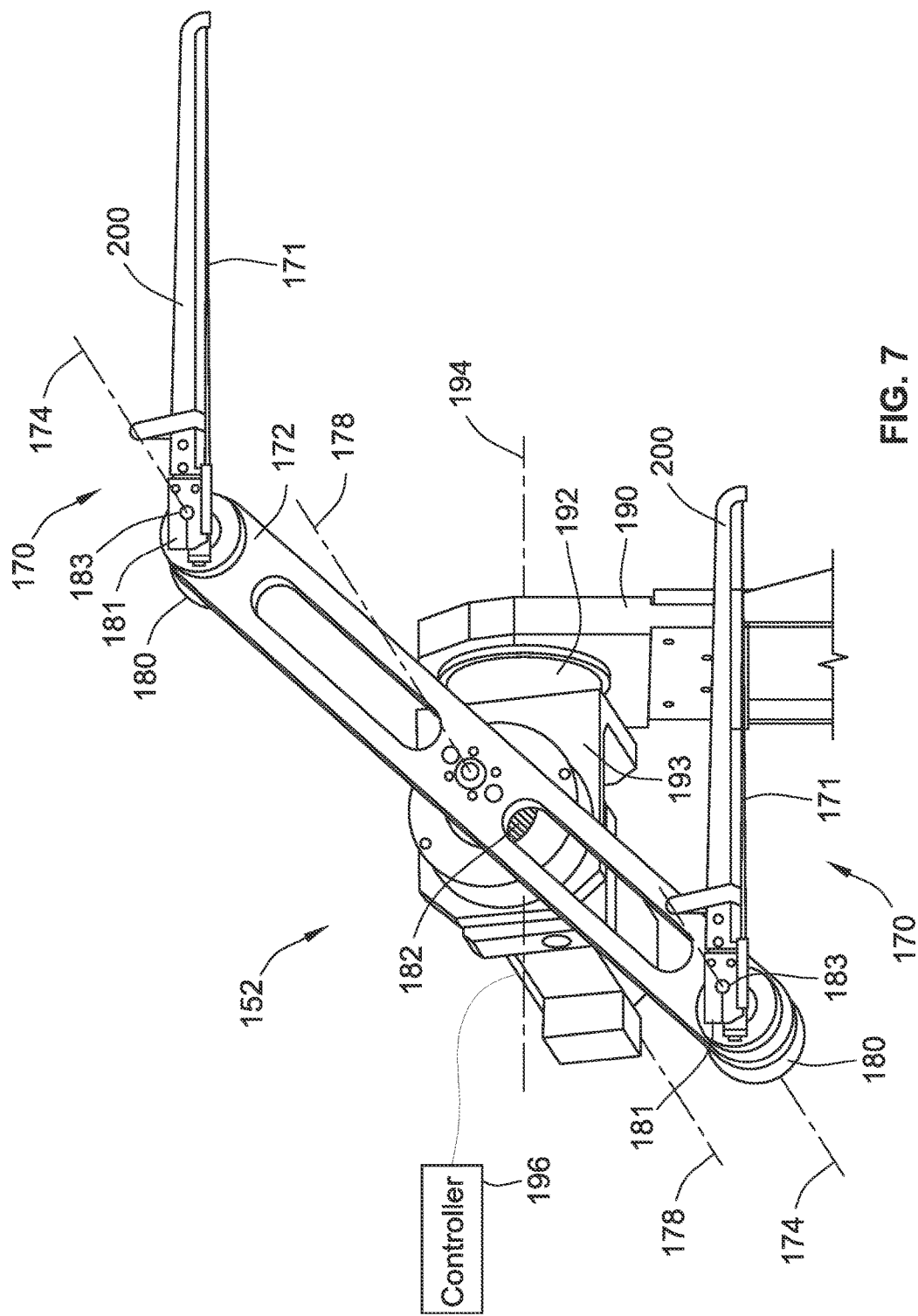
FIG. 7 is a perspective illustration of a cutoff apparatus for cutting a plastic sleeve between adjacent stacks to form individual units of product.

One embodiment of a cutoff apparatus 152 is illustrated in FIG. 7. The cutoff apparatus 152 of this embodiment is a dual head orbit hot wire cutoff that includes two hot wire cutoff heads 170 (also referred to as "cutoff heads 170"). Each cutoff head 170 includes a heated cutting element, which in the illustrated embodiment is a tensioned heated wire 171. Preferably, the heated wires 171 extend at an angle of between about 0 and 25 degrees relative to the ground and in some embodiments the angle is less than about 20 degrees relative to the ground. In some embodiments, the angle is less than about 15 degrees relative to the ground and in further embodiments; the angle is less than about 10 degrees relative to the ground. In these situations, the ground would typically be generally parallel to a generally planar top surface of the stacks or to a support surface of the in-feed conveyor 144. As such, these values may be taken relative to such a top surface or the support surface of the in-feed conveyor 144, rather than the ground.

Figure 13:
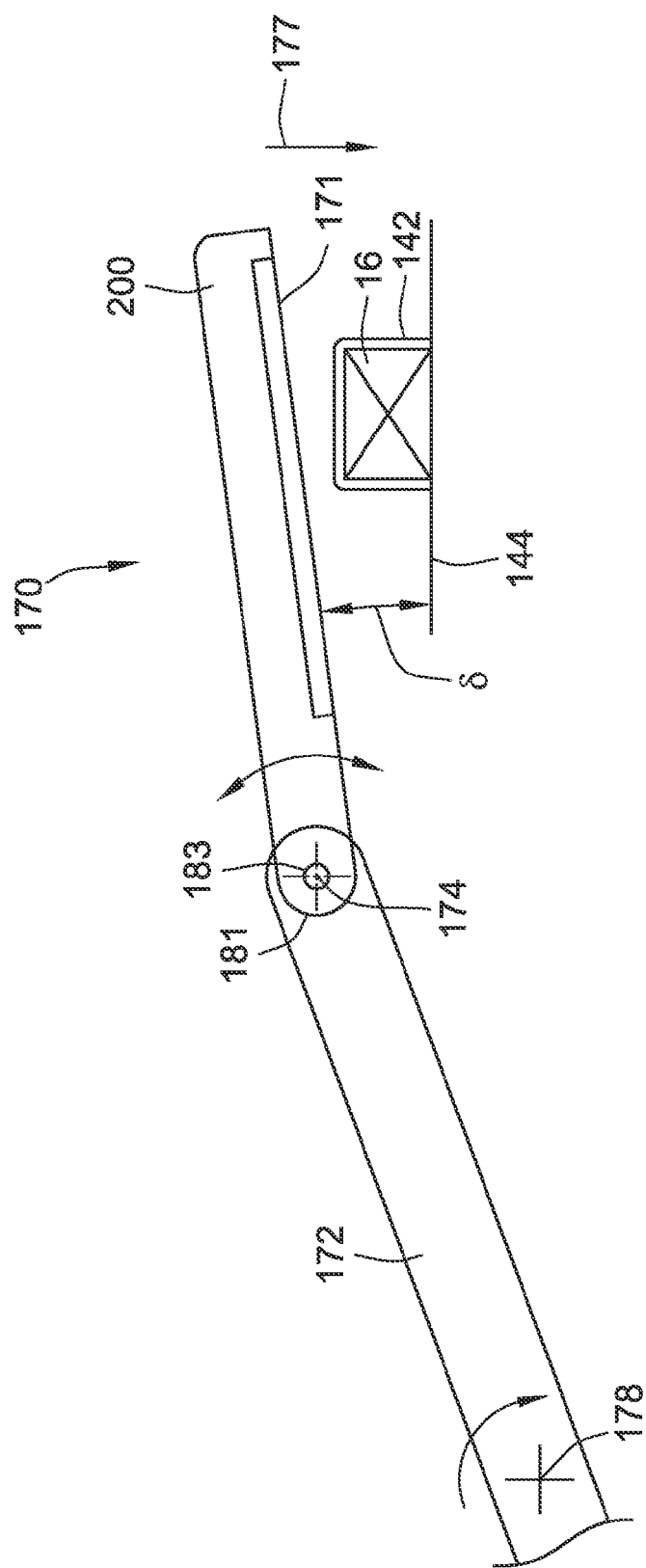
FIG. 13 is a front schematic illustration of the cutoff apparatus of FIG. 7.

The cutoff heads 170 are operably rotatably attached to opposite ends of a rotating arm 172. Each cutoff head 170 is mounted to the rotating arm 172 for rotation about a cutoff head axis of rotation 174. The rotating arm 172 is operably attached to a drive motor 176 for rotating the rotating arm 172 about rotational axis 178, which is typically parallel to cutoff head axes of rotation 174. The cutoff apparatus 152 is configured such that as the rotating arm 172 rotates about rotational axis 178, each cutoff head 170 rotates about corresponding cutoff head axis of rotation 174 to maintain the heated wires 171 at a constant orientation or angle δ relative to the ground or support surface of the in-feed conveyor 144 (see e.g. FIG. 13). With this configuration, as the heated wires 171 make a cut through the sleeve 142, the linear speed in the generally vertically downward direction (illustrated by arrow 177) is constant across the entire width W (see FIG. 1) of the units 160.

The cutoff apparatus 152 includes a drive arrangement that drives the cutoff heads 170 to rotate about their corresponding cutoff head axis of rotation 174. The drive arrangement is illustrated by sprockets 180, 182 in FIG. 7. One or more connecting chains (not shown) would extend therebetween. The drive arrangement rotates the cutoff heads 170 about axes 174 in an opposite rotational direction as a rotational direction that rotating arm 172 rotates about rotational axis 178. The cutoff heads 170 will rotate at a same angular speed about the cutoff head axes of rotation 174 as the rotating arm 172 rotates about rotational axis 178, again to maintain the constant orientation of the cutoff wires 171.

A drive shaft 184 or alternatively a gearbox is operably coupled between the rotating arm 172 and drive motor 176 to transfer rotational motion to the rotating arm 172. The rotating arm 172 will rotate relative to sprocket 182 in operation such that sprocket 182 can drive sprockets 180 and cutoff heads 170. Sprocket 182 remains in a fixed position relative to L-shaped bracket 193. Due to this rotation about rotational axis 178 and axes 174 the cutoff heads 170 exhibit orbital motion.

The cutoff heads 170 pass through a cutting gap 186 formed between in-feed conveyor 144 and a transport conveyor 188. Typically, the rotational axis 178 preferably extends at a non-parallel, non-perpendicular angle Σ relative to the ground or the support surface of the in-feed conveyor 144 (see e.g. FIG. 12). This arrangement allows the cutoff heads 170 to travel in a longitudinally downstream direction, illustrated by arrow 191 in FIG. 2 and arrow 177 in FIG. 12, as the cutoff heads 170 perform a generally vertically downward stroke while passing through cutting gap 186. This allows the cutoff heads 170 to form a generally planar cut through the sleeve 142 that is generally perpendicular to longitudinal length of the sleeve 142, due to the fact that the sleeve 142 and adjacent stacks 16 are traveling downstream while the cutting action occurs.

The cutoff apparatus 152 includes a support base 190 for operably vertically supporting the drive motor 176, rotating arm 172 and cutoff heads 170. A rotational axis adjustment mechanism 192 is operably interposed between the rotating arm drive shaft 184 and the support base 190. An L-shaped bracket 193 is attached to the rotational axis adjustment mechanism 192 and drive motor 176. With additional reference to FIG. 12, the rotational axis adjustment mechanism 192 is configured to adjust the angle E between rotational axis 178 and the ground or the top surface of the in-feed conveyor 144 (i.e. horizontal) so as to adjust the angle θ at which the cutoff heads 170 pass through cutting gap 186 (i.e. in a more or less downstream direction as the cutoff heads 170 pass through the cutting gap 186). This angle θ is generally defined between the plane 175 in which the cutoff heads 170 and wires 171 rotate and translate as they rotate about rotational axis 178 and the ground or support surface of the in-feed conveyor 144. This plane 175 is generally orthogonal to rotational axis 178 as well as cutoff head axes of rotation 174. The rotational axis adjustment mechanism 192 rotates the rotational axis 178 about an adjustment axis 194 that is perpendicular to the rotational axis 178 by rotating L-shaped bracket 193 and the attached drive motor 176 about adjustment axis 194. The adjustment axis 194 is also perpendicular to the flow path along which the stacks 16 and sleeve 142 travel across cutting gap 186. However, adjustment axis 194 is generally parallel to plane 175 in which the cutoff heads 170 rotate.

Adjustments about adjustment axis 194 typically occur when the stack/unit pitch changes. However, when adjustments are made about axis 194, to maintain the angle δ at which the wire 171 travels within plane 175, the cutoff heads 170 are adjustably connected to the drive arrangement by adjustable mounting arrangements. With reference to FIG. 7, in the illustrated embodiment, the adjustable mounting arrangements include clamps 181 that clamp support arms 200 of the cutoff heads 170 to shafts 183 that are operably coupled to sprockets 180. The clamps 181 allow the angular orientation of the support arms 200 to be adjusted bout cutoff head axis of rotation 174 relative to sprockets 180 and shafts 183. When adjustments occur about axis 194, the adjustable mounting arrangements allow for angular adjustment of the cutoff heads 170 and particularly the heated wires 171 thereof relative to the ground, the support surface of the in-feed conveyor 144 or a top surface of the sleeve or stacks. Typically, the adjustment about cutoff head axis of rotation 174 is equal and opposite to the adjustment about adjustment axis 194.

The cutoff apparatus 152 can be coupled to a controller 196, which may be part of or separate from other controllers of the pack forming system 10. The controller 196 can be, can include or can otherwise control a power supply that is operably attached to the heated wires 171. The controller 196 can control and adjust the current flowing through the heated wires 171. The controller 196 will typically adjust the current flow through the heated wires in relation to the rotational speed of the rotating arm 172 about rotational axis 178. As such, when the rotating arm 173 rotates faster, more current is supplied to the heated wires 171. Typically, this is a proportional relationship. However, non-proportional relationships can be used. This is particularly true, when it is desired to have the current adjusted proportionally to the speed at which the heated wire 171 travels vertically downward through the cutting gap 186. Some embodiments can use a constant current through the heated wires 171. The proportional control of the current is beneficial when operating at slower speeds so as to avoid overheating the heated wire 171.

The controller can also be used to control drive motor 176 as well as rotational axis adjustment mechanism 192.

A stack position sensor 198 can operably communicate with the controller 196 so as to adjust operation of the cutoff apparatus 152 based on the relative position of adjacent stacks 16. This allows for each cut of the sleeve 142 to be formed halfway between adjacent stacks 16 even if the stacks 16 are not correctly longitudinally spaced. In one embodiment, the controller 196 controls the drive motor 176 to adjust the instantaneous rotational speed of the rotating arm 172 to adjust the cutting time and form the cut halfway between misaligned adjacent stacks 16. Alternative methods can include adjusting the longitudinal position of the rotating arm 172 forward or backward along the flow path 38.

Each cutoff head 170 includes an L-shaped support arm 200 (see FIG. 7) to which the heated wire 171 is operably attached. The heated wire 171 is tensioned or otherwise spring loaded because the wire will expand due to thermal expansion as it is heated.

The illustrated cutoff apparatus 152 includes two cutoff heads 170 such that it makes two passes through cutting gap 186 per revolution. Alternative embodiments may include only a single cutoff head 170 such that it makes a single pass through cutting gap 186 per revolution. However, the dual head arrangement provides improved balance as well as throughput capacities. Further, dual head arrangements allow for a lower cutting velocity because the cutoff apparatus rotational speed can be reduced in half because it makes two cuts per rotation.

Figure 8:
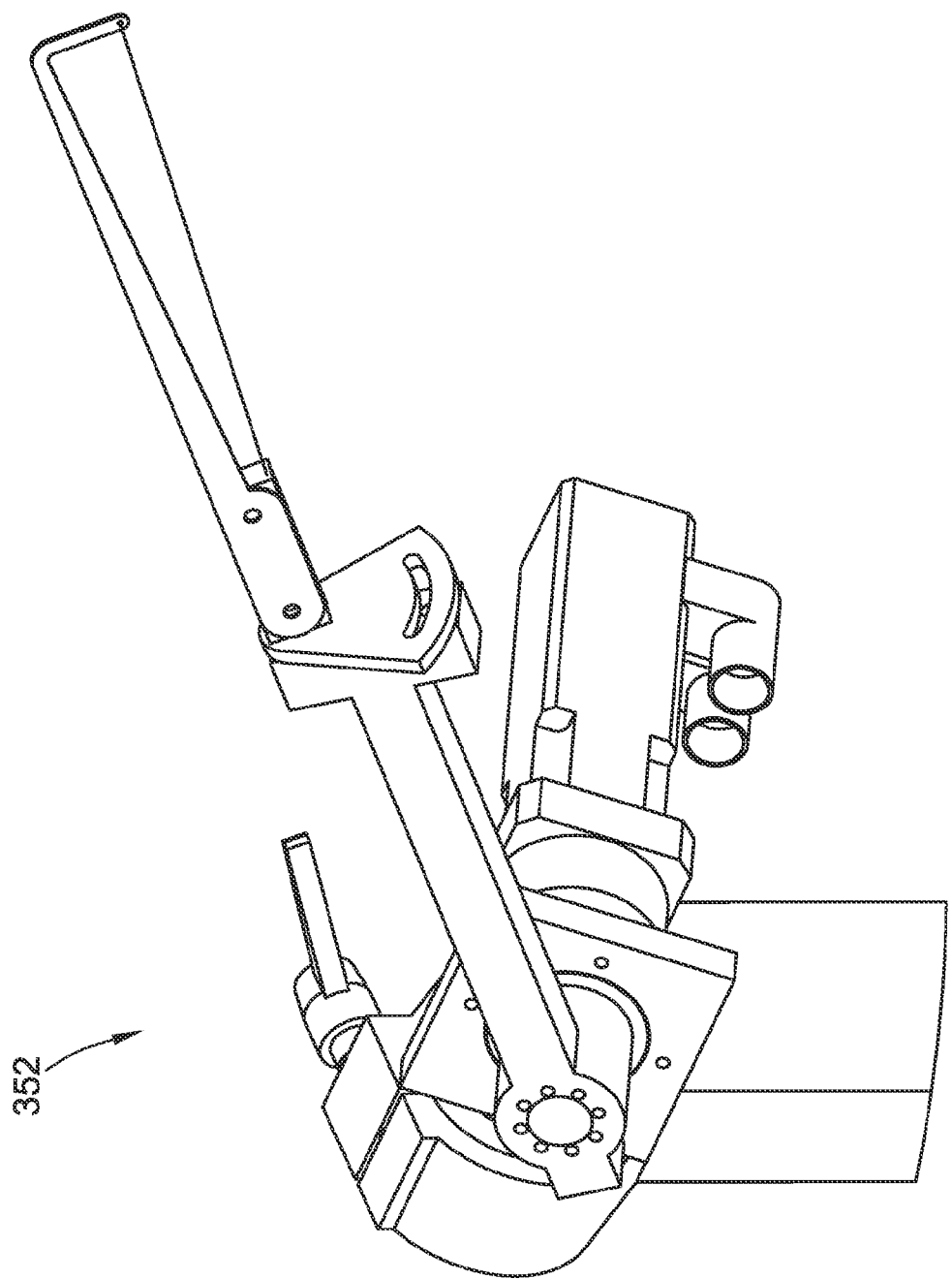
FIG. 8 is an alternative embodiment of a cutoff apparatus.

Further yet, alternative, simpler, embodiments could do without the orbiting cutoff head and mount the heated wire in a fixed position with regard to the rotating arm. Cutoff apparatus 352 is such an embodiment is illustrated in simplified form in FIG. 8. However, this embodiment suffers from the fact that the heated wire will not travel through the sleeve at the same linear speed. The portion of the heated wire closest to the axis of rotation of the rotating arm has a smaller linear velocity component which causes a twisted cut, unlike the previously discussed orbiting designs. The orbiting designs also use less floor space because the cutoff heads 170 do not extend radially outward, much if at all, past the distal ends of the rotating arm 172 during the upward directed stroke. The orbiting designs also allow for reduced cutting velocity than the simpler fixed head cutoff apparatus.

With reference to FIG. 2, after the sleeve 142 is cut between adjacent stacks 16, the units 160 travel downstream with the upstream trailing portion 164 of a downstream unit 160 adjacent a downstream leading portion 162 of an upstream unit 160. To close the open free ends 162, 164 of each unit 160, the units 160 are moved through a ninety degree change in orientation so that the open portions 162, 164 can be folded inward as the units 160 pass through an end flap folding apparatus 240. Typically such an end flap folding apparatus 240 will include at least three stationary fold formers. U.S. Pat. No. 4,959,945 illustrates one folding sequence that may be incorporated.

The transport conveyor 188 carries the continuous stream of spaced apart units 160 to a turner apparatus 220. The turner apparatus 220 changes the orientation of the units 160 relative to the path along which the units 160 are traveling by approximately 90 degrees. As such, the open free ends 162, 164 of the sleeve 142 and the lead end 166 and trailing end 168 of the corresponding stack 16 are generally located at a same longitudinal position along the travel path rather than longitudinally offset from one another, such as prior to manipulation by the turner apparatus 220. Now, the lead end 166 and trailing end 168 are positioned such that they extend parallel to the travel path, rather than perpendicular, such as prior to manipulation by the turner apparatus. In the illustrated embodiment, the turner apparatus 220 effectuates this 90 degree rotation by changing the direction of travel for the units 160 by approximately 90 degrees while maintaining the angular orientation of the units 160 within a generally horizontal plane. Unlike prior designs that use a pusher arrangement to push the units from the transport conveyor to another conveyor traveling at a 90 degree direction thereto, the turner apparatus 220 changes the direction of travel by ninety degrees without sudden changes of direction. Further, it avoids the inherent time delay in using a reciprocating pusher arrangement that must clear the flow path by traveling along the flow path prior to receiving a subsequent unit. In this embodiment, the mechanism that changes the orientation of the sleeved packs 106 travels along the travel path in one direction and does not undergo reciprocating motion along the travel path, i.e. back and forth motion, like in the reciprocating pusher arrangements.

While it is preferred to change the direction of travel by an angle of between about 60 and 120 degrees, and more preferably 90 degrees, other embodiments may not even change the direction of travel, but merely rotate the units 160 by approximately 90 degrees.

The turner apparatus 220 includes a plurality of sleeved stack control mechanisms 222 that are operably attached to a carousel 224. In FIG. 2, only a few of the sleeved stack control mechanisms 222 are illustrated. However, in practice, the entire periphery of the carousel 224. The sleeved stack control mechanisms 222 are configured for grabbing or otherwise controlling the motion of units 160. The carousel 224 rotates the sleeved stack control mechanisms 222 about a carousel axis of rotation 226 in a first angular direction 227 to transport the grabbed units 160 from the transport conveyor 188 to a discharge conveyor 228 along an arcuate path 230 through a predetermined carousel angle $\beta$. In the illustrated embodiment, the carousel angle $\beta$ is approximately ninety degrees. As noted above, other angles could be used. The discharge conveyor 228 defines a discharge path 229 that extends at a generally ninety degree angle relative to transport conveyor 228 and the flow path 38 such that after transport along the arcuate path 230, the units 160 travel in a new linear direction, i.e. perpendicular to the flow path 38 and the direction of travel along transport conveyor 188. The arcuate path has a radius of at least 1 foot and preferably at least 1.5 feet and even more preferably at least 2 feet. In other embodiments, the carousel angle is between about 45 and 135 degrees such that the discharge conveyor 228 extends at a corresponding angle relative to the transport conveyor 188.

Each sleeved stack control mechanism 222 is rotatably attached to the carousel 224 for rotation about a corresponding sleeved stack control mechanism axis of rotation 232 in a second, opposite angular direction 234 through a sleeved stack control mechanism angle equal of approximately ninety degrees relative to the carousel 224. Thus, in the illustrated embodiment, the sleeved stack control mechanism angle is substantially equal to the carousel angle. In some embodiments, the sleeved stack control mechanism rotates about axis of rotation 232 greater than 85 degrees. In some embodiments, the angle is between about 88 and 92 degrees. The sleeved stack control mechanisms 222 rotate about the corresponding sleeved stack control mechanism axes of rotation 232 at substantially a same angular speed such that as each unit is transported from the transport conveyor 188 to the discharge conveyor 228, the orientation of the units 160 does not change. A cam arrangement may be provided between the carousel and the sleeved stack control mechanisms 222 to effectuate the rotational motion of the sleeved stack control mechanisms 222 about the sleeved stack control mechanism axes of rotation 232. For instance, a plate cam and cam follower may be provided. The sleeved stack control mechanisms 222 need not make complete rotations about the sleeved stack control mechanism axes of rotation 232 but could instead rotate in the opposite direction after releasing a unit 160 and prior to grabbing a new unit 160 from the continuous stream of units. Further embodiments could use other non-cam related mechanisms for rotating the sleeved stack control mechanisms 222 such as lead screws, gears and motors, or other electronic type mechanisms.

Each unit 160 has a longitudinal length parallel to a longitudinal unit axis 236 extending between the downstream lead portion 162 and upstream trail portion 164 that is generally parallel to the feed path when the units 160 are carried by the in-feed and transport conveyors 144, 188. Each unit 160 also has a transverse unit axis 238 that is perpendicular to the longitudinal unit axis 236.

After being transported by the turner apparatus 220, the longitudinal unit axis 236 of each unit 160 is oriented perpendicular to discharge path 229. Similarly, the transverse unit axis 238 is oriented parallel to discharge path 229.

The discharge conveyor 228 carries the units 160 to an end flap folding apparatus 240 that folds and welds the downstream leading portion 162 and upstream trailing portion 164 of the sleeve 142 against the ends of the stack 16 to form completed packs 12. The operation of the turner apparatus 220 discussed above properly orients the units 160 relative to the discharge path 229 for entry into and passage through the end flap folding apparatus 240. More particularly, the free open ends 162, 164 of the sleeve 142 are exposed for engagement with appropriate folding and welding mechanisms for closing the ends of the sleeve 142.

With reference to FIG. 9, each sleeved stack control mechanism 222 of the illustrated embodiment includes a control mechanism suction apparatus in the form of a control mechanism suction cup 250 for selectively applying a vacuum to a top surface of each unit 160, and particularly to the sleeve 142 thereof. A vacuum is selectively applied to the control mechanism suction cups 250 to grab individual units 160. While control mechanism suction cups are illustrated, other apparatus could be used such as for example a flat plate with vacuum holes or grooves. With reference to FIG. 2, the turner apparatus 220 includes a valve arrangement 252 for selectively applying and removing the vacuum to the suction cups 250. Preferably, the valve arrangement 252 is configured to expose the suction cups 250 to vacuum slightly prior to a sleeved stack control mechanism 222 aligning with a corresponding unit 160. Similarly, the valve arrangement 252 turns off vacuum at the end of the arcuate path 230 to release the unit 160 at the desired location on discharge conveyor 228.

The turner apparatus 220 rotates at a constant speed relative to carousel axis of rotation 226 and is phased to the flow of units 160 on the transport conveyor 188. The turner apparatus 220 is configured such that each pack control mechanism 222 places the corresponding suction cup 250 on the center of a unit, and at least centered along the longitudinal unit axis 236. If the pack control mechanism 222 is not centered on a unit 160 and at a minimum along the longitudinal unit axis 236 in the illustrated embodiment, the unit 160 will not be released onto the discharge conveyor 228 properly centered for entering the end flap folding apparatus 240. If sideways positioning errors occur in placing the units 160 on the discharge conveyor 228, errors may occur in closing or otherwise folding portions 162, 164 of the sleeves 142.

The sleeved stack control mechanisms 222 are mounted to the carousel 224 for linear motion as well as rotational motion relative to the carousel 224. The sleeved stack control mechanisms 222 are mounted to move parallel to the carousel axis of rotation as well as parallel to the sleeved stack control mechanism axes of rotation 232, i.e. vertically up and down. A sleeved stack control mechanism 222 will transition vertically downward to grab an individual unit 160 proximate the beginning of arcuate path 230 and then vertically upward after the unit 160 has been placed on discharge conveyor 228 proximate the end of the arcuate path 230. The ninety degree rotation of the individual units 160 about the corresponding sleeved stack control mechanism axis of rotation 232 occurs during the period of time while the units 160 are engaged by the sleeved stack control mechanisms 222. A cam arrangement may be provided between the carousel 224 and the sleeved stack control mechanisms 222 to effectuate the vertical positioning of the sleeved stack control mechanisms 222 and particularly the suction cups 250 thereof. For instance, a barrel cam and cam follower may be provided that controls both the vertical up and down positions of the cam follower.

The sleeved stack control mechanisms may be operably mounted on linear bearings or on pivot arm assemblies for permitting the vertical motion relative to carousel 224.

The turner apparatus 220 could include any number of pack control mechanisms 222.

It should be understood that by using the turner apparatus 220, the units 160 continue with substantially a constant speed at all times but merely the direction of the velocity vector is changed using the turner apparatus 220. Additionally, the beginning of the arcuate path 230 along which the sleeved stack control mechanisms 222 carry a unit 160 is tangent to the centerline of the flow path 38 along which the units 160 are fed to the turner. Similarly, the end of the arcuate path 230 along which the sleeved stack control mechanisms 222 carry the unit 160 is tangent to the centerline of the discharge path 229 along which the units 160 are taken away from the turner apparatus 220. As such, the units 160 are exposed to constant speed but with only a changing direction of the velocity vector. Therefore, the units 160 are not exposed to discontinuous changes in motion such as if a right angle pusher arrangement were used. Additionally, the sleeved packs 160 remain in a substantially constant angular orientation within a horizontal plane that is also a plane parallel to the top surface of the transport and discharge conveyors 188, 228 as the packs travel along the arcuate path 230.

Further, once the stacks 16 are discharged from the stack separator apparatus, each stack will continue with a velocity component in a downstream direction parallel to flow path 38 that remains substantially constant until the stacks 16 reach the turner apparatus 220. It is noted that the stacks 16 are accelerated in the transverse direction by the stack merger apparatus 100, but the stacks 16 still travel with the same velocity component parallel to flow path 38.

Using the present arrangement, the starting and stopping and abrupt changes in direction as used in the prior art is eliminated such that significantly increased pack handling speeds can be accommodated.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A cutoff apparatus for cutting a plastic sleeve between adjacent spaced stacks of sheet like products positioned within the plastic sleeve, the plastic sleeve and spaced stacks of sheet like products moving longitudinally along a flow path, the cutoff apparatus comprising:
   a drive motor;
   a rotating arm operably coupled to the drive motor for rotation of the rotating arm about a rotational axis; and
   a first heated cutting element operably pivotally attached to the rotating arm such that the first heated cutting element is maintained at a substantially constant orientation as the rotating arm rotates about the rotational axis.

2. The cutoff apparatus of claim 1, further comprising a second heated cutting element operably pivotally attached to the rotating arm such that the second heated cutting element is maintained at a substantially constant orientation as the rotating arm rotates about the rotational axis.

3. The cutoff apparatus of claim 2, wherein the first and second heated cutting elements are operably pivotally attached at opposite ends of the rotating arm and on opposite sides of the rotational axis.

4. The cutoff apparatus of claim 1, further comprising a power supply operably attached to the first heated cutting element to adjust a current flowing through the first heated cutting element, the power supply configured to operably adjust the current flowing through the first heated cutting element in relation to a rotational speed of the rotating arm about the rotational axis.

5. The cutoff apparatus of claim 1, wherein the rotational axis extends at a non-parallel oblique angle relative to the flow path, the rotational axis being oriented relative to the flow path such that the first heated cutting element travels in a downstream direction along the flow path as the first heated cutting element cuts the plastic sleeve.

6. The cutoff apparatus of claim 5, wherein the non-parallel oblique angle is correlated relative to a flow rate of the sleeve of plastic along the flow path such that the first heated cutting element makes a cut through the sleeve of plastic that is substantially perpendicular to the sleeve.

7. The cutoff apparatus of claim 5, further comprising a support base, a rotational axis adjustment mechanism, and a rotating arm drive shaft that rotates about the rotational axis and is operably connected to the rotating arm, the rotational axis adjustment mechanism operably coupled between the rotating arm drive shaft and the support base and configured to rotate the rotating arm drive shaft about an adjustment axis that is perpendicular to the rotational axis so as to adjust the angle of the rotational axis relative to the flow path.

8. The cutoff apparatus of claim 1, further comprising:
   a stack sensor configured to sense the positions of adjacent stacks between which the first heated cutting element passes;
   a controller configured to adjust the motion of the first heated cutting element such that the first heated cutting element passes substantially half way between the adjacent stacks.

9. The cutoff apparatus of claim 8, wherein the controller is configured to adjust the rotational speed of the rotating arm to adjust the motion of the first heated cutting element.

10. A method of cutting a plastic sleeve between adjacent spaced stacks of sheet like products positioned within the plastic sleeve,
   moving a plastic sleeve and spaced stacks of sheet like products longitudinally along a flow path,
   cutting the plastic sleeve between adjacent spaced stacks of sheet like products using a cutoff apparatus of claim 1;
   cutting includes:
      rotating the rotating arm operably with the drive motor about the rotational axis; and
      maintaining the first heated cutting element in a substantially constant orientation as the rotating arm rotates about the rotational axis.

11. The method of claim 10, further including adjusting a current flowing through the first heated cutting element in relation to a rotational speed of the rotating arm about the rotational axis.

12. The method of claim 10, wherein the rotational axis extends at a non-parallel oblique angle relative to the flow path, the rotational axis being oriented relative to the flow path such that the first heated cutting element travels in a downstream direction along the flow path as the first heated cutting element cuts the plastic sleeve.

13. The method of claim 12, wherein the non-parallel oblique angle is correlated relative to a flow rate of the sleeve of plastic along the flow path such that the first heated cutting element makes a cut through the sleeve of plastic that is substantially perpendicular to the sleeve.

14. The method of claim 12, further comprising a support base, a rotational axis adjustment mechanism, and a rotating arm drive shaft that rotates about the rotational axis and is operably connected to the rotating arm, the rotational axis adjustment mechanism operably coupled between the rotating arm drive shaft and the support base and configured to rotate the rotating arm drive shaft about an adjustment axis that is perpendicular to the rotational axis so as to adjust the angle of the rotational axis relative to the flow path.

15. The method of claim 10, further comprising:
sensing the positions of adjacent stacks between which the first heated cutting element passes; and
adjusting the motion of the first heated cutting element such that the first heated cutting element passes substantially half way between the adjacent stacks.

16. The method of claim 15, wherein in the step of adjusting includes adjusting the rotational speed of the rotating arm to adjust the motion of the first heated cutting element.

17. A cutoff apparatus for cutting a plastic sleeve between adjacent spaced stacks of sheet like products positioned within the plastic sleeve, the plastic sleeve and spaced stacks of sheet like products moving longitudinally along a flow path, the cutoff apparatus comprising:
a drive motor;
a rotating arm operably coupled to the drive motor for rotation of the rotating arm about a rotational axis; and
a first heated cutting element attached to the rotating arm;
a power supply operably attached to the heated cutting element to adjust a current flowing through the heated cutting element, the power supply configured to operably adjust the current flowing through the heated cutting element in relation to a rotational speed of the rotating arm about the rotational axis.

18. The cutoff apparatus of claim 17, wherein the first heated cutting element is operably pivotally attached to the rotating arm such that the first heated cutting element is maintained at a substantially constant orientation as the rotating arm rotates about the rotational axis.

* * * * *